United States Patent
Tseng et al.

(10) Patent No.: US 10,201,921 B1
(45) Date of Patent: Feb. 12, 2019

(54) MOLDING SYSTEM FOR PREPARING FIBER-REINFORCED THERMOPLASTIC COMPOSITE ARTICLE

(71) Applicant: CORETECH SYSTEM CO., LTD., Chupei, Hsinchu County (TW)

(72) Inventors: Huan-Chang Tseng, Chupei (TW); Rong-Yeu Chang, Chupei (TW); Chia-Hsiang Hsu, Chupei (TW)

(73) Assignee: CORETECH SYSTEM CO., LTD., Chupei, Hsinchu County (TW)

( * ) Notice: Subject to any disclaimer, the term of this patent is extended or adjusted under 35 U.S.C. 154(b) by 0 days.

(21) Appl. No.: 16/057,090

(22) Filed: Aug. 7, 2018

Related U.S. Application Data

(60) Provisional application No. 62/625,061, filed on Feb. 1, 2018.

(51) Int. Cl.
*B29C 45/77* (2006.01)
*B29C 45/00* (2006.01)

(52) U.S. Cl.
CPC .......... *B29C 45/77* (2013.01); *B29C 45/0005* (2013.01); *B29C 2945/7604* (2013.01); *B29C 2945/76006* (2013.01); *B29C 2945/76056* (2013.01); *B29C 2945/76187* (2013.01); *B29C 2945/76381* (2013.01); *B29C 2945/76545* (2013.01); *B29C 2945/76665* (2013.01); *B29C 2945/76859* (2013.01); *B29K 2995/0044* (2013.01)

(58) Field of Classification Search
None
See application file for complete search history.

(56) References Cited

U.S. PATENT DOCUMENTS

| | | | |
|---|---|---|---|
| 9,283,695 B1 * | 3/2016 | Tseng | B29C 45/7693 |
| 9,573,307 B1 * | 2/2017 | Tseng | B29C 45/7693 |
| 9,862,133 B1 | 1/2018 | Tseng et al. | |

(Continued)

OTHER PUBLICATIONS

Lipscomb II GG, Denn MM, Hur DU, Boger DV. The flow of fiber suspensions in complex geometries. J Non-Newtonian Fluid Mech 1988; 26 297-325.

(Continued)

*Primary Examiner* — Robert B Davis
(74) *Attorney, Agent, or Firm* — Muncy, Geissler, Olds & Lowe, P.C.

(57) ABSTRACT

The present disclosure provides a molding system for preparing a fiber-reinforced thermoplastic composite article. The molding system includes: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine; and a controller coupled to the processing module and configured to control the molding machine with the molding condition to perform an actual molding process for preparing the fiber-reinforced thermoplastic composite article. The anisotropic stress distribution of the composite molding resin is generated based in part on consideration of an anisotropic rotational diffusion effect of the fibers in the composite molding material.

12 Claims, 21 Drawing Sheets

(56) References Cited

U.S. PATENT DOCUMENTS 9,919,465 B1* 3/2018 Tseng .................... B29C 45/77
2012/0330627 A1* 12/2012 Tseng ................. B29C 45/7693
703/2

OTHER PUBLICATIONS

VerWeyst BE. Numerical predictions of flow-induced fiber orientation in three-dimensional geometries. Urbana-Champaign: Ph.D. Thesis, University of Illinois; 1998.

Chung DH, Kwon TH. Invariant-based optimal fitting closure approximation for the numerical prediction of flow-induced fiber orientation. J Rheol 2002; 46(1) 169-194.

VerWeyst BE, Tucker III CL. Fiber suspensions in complex geometries: Flow/orientation coupling. Can J Chem Eng 2002; 80(6) 1093-1106.

Rong-yeu Chang and Wen-hsien Yang, "Numerical simulation of mold filling in injection molding using a three-dimensional finite volume approach," International Journal for Numerical Methods in Fluids vol. 37, Issue 2, pp. 125-148, Sep. 30, 2001.

Cross MM. Relation between viscoelasticity and shear-thinning behaviour in liquids. Rheol Acta 1979; 18(5) 609-614.

Tianya Li, et al.; "Flow-Fiber Coupled Viscosity in Injection Molding Simulations of Short Fiber Reinforced Thermoplatics"; May 30, 2018; 22 pgs.

* cited by examiner

MOLDING SYSTEM FOR PREPARING FIBER-REINFORCED THERMOPLASTIC COMPOSITE ARTICLE

CROSS-REFERENCE TO RELATED APPLICATION

This patent application claims priority under 35 U.S.C. § 119(e) from Provisional Patent Application No. 62/625,061, filed Feb. 1, 2018, the disclosure of which is incorporated by reference herein in its entirety, including all exhibits appended to Provisional Patent Application No. 62/625,061.

TECHNICAL FIELD

The present disclosure relates to a molding system for preparing a fiber-reinforced thermoplastic (FRT) composite article, and more particularly, to an injection molding system for preparing an FRT composite article using a computer-aided engineering (CAE) simulation.

DISCUSSION OF THE BACKGROUND

Fiber-reinforced thermoplastic (FRT) composite articles, produced by molding techniques such as injection molding, have assumed great importance in the manufacture of many products due to their specific mechanical properties, including tensile strength, electrical conductivity, and other characteristics. In order to optimize the quality of the FRT composite articles, it is desirable to accurately predict molding phenomena occurring during a molding process. However, despite significant efforts by many researchers, simulations have thus far failed to achieve satisfactory results.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing a fiber-reinforced thermoplastic composite article. The molding system comprises: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an anisotropic rotational diffusion effect of the fibers in the composite molding material; and a controller coupled to the processing module and configured to control the molding machine with the molding condition to perform an actual molding process for preparing the fiber-reinforced thermoplastic composite article.

In some embodiments, the anisotropic rotational diffusion effect of the fibers is represented by an expression:

$$D_R = D:A_4:D$$

where $D_R$ represents the anisotropic rotational diffusion effect of the fibers, D represents a rate of deformation of the molding material, and $A_4$ represents an orientation distribution of the fibers.

The present disclosure also provides a molding system for preparing a fiber-reinforced thermoplastic composite article, the molding system comprising: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an anisotropic degree of the fibers in the composite molding material; and a controller coupled to the computing apparatus and configured to control the molding machine with the molding condition to perform an actual molding for the fiber-reinforced thermoplastic composite article.

In some embodiments, the anisotropic degree of the fibers is represented by a ratio of a fiber's shear rate to a resin's shear rate.

In some embodiments, the anisotropic degree of the fibers is represented by an expression:

$$\left(\frac{\dot{\gamma}_F}{\dot{\gamma}_R}\right)^2 = \frac{D:A_4:D}{D:D}$$

where $\dot{\gamma}_F$ represents the fiber's shear rate, $\dot{\gamma}_R$ represents the resin's shear rate, D represents a rate of deformation of the composite molding material, and $A_4$ represents an orientation distribution of the fibers.

The present disclosure also provides a molding system for preparing a fiber-reinforced thermoplastic composite article, the molding system comprising: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an integral effect of a shear rate and an anisotropic degree of the composite molding material; and a controller coupled to the computing apparatus and configured to control the molding machine with the molding condition to perform an actual molding for the fiber-reinforced thermoplastic composite article.

In some embodiments, the integral effect of the shear rate and the anisotropic degree of the composite molding material is represented by an expression:

$$N_P(\dot{\gamma}) = N_{P0} \frac{1}{1 + (\dot{\gamma}/\dot{\gamma}_c)^2}$$

where $N_P(\dot{\gamma})$ represents the integral effect, $N_{P0}$ represents a constant, $\dot{\gamma}$ represents the shear rate, and $\dot{\gamma}_c$ represents a critical shear rate.

In the present disclosure, a model of a stress tensor is proposed for easily obtaining convergent numerical results and successfully simulating anisotropic flow patterns in an injection molding simulation. The ultimate aim of the present disclosure is to apply this model in simulation operations performed in the injection molding system for preparing a complex 3D geometrical FRT composite article.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

the coupling flow-fiber parameter for the anisotropic degree of the composite molding material ($N_p$), the shear stress distribution, respectively, in accordance with some embodiments of the present disclosure.

Figure 7:
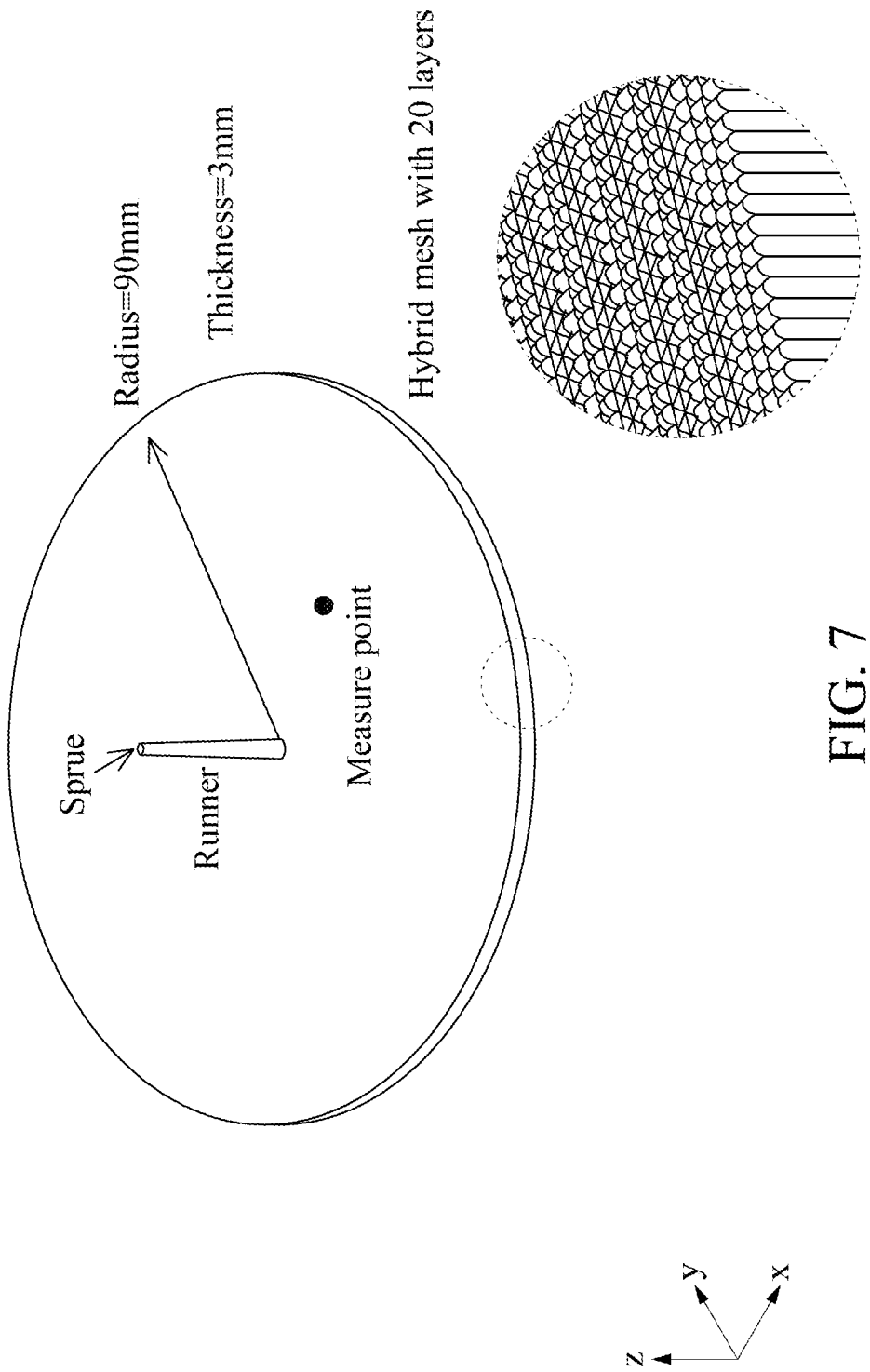
FIG. 7 is a schematic view of an injection molding simulation of a center-gated disk in accordance with some embodiments of the present disclosure.
Figure 17:
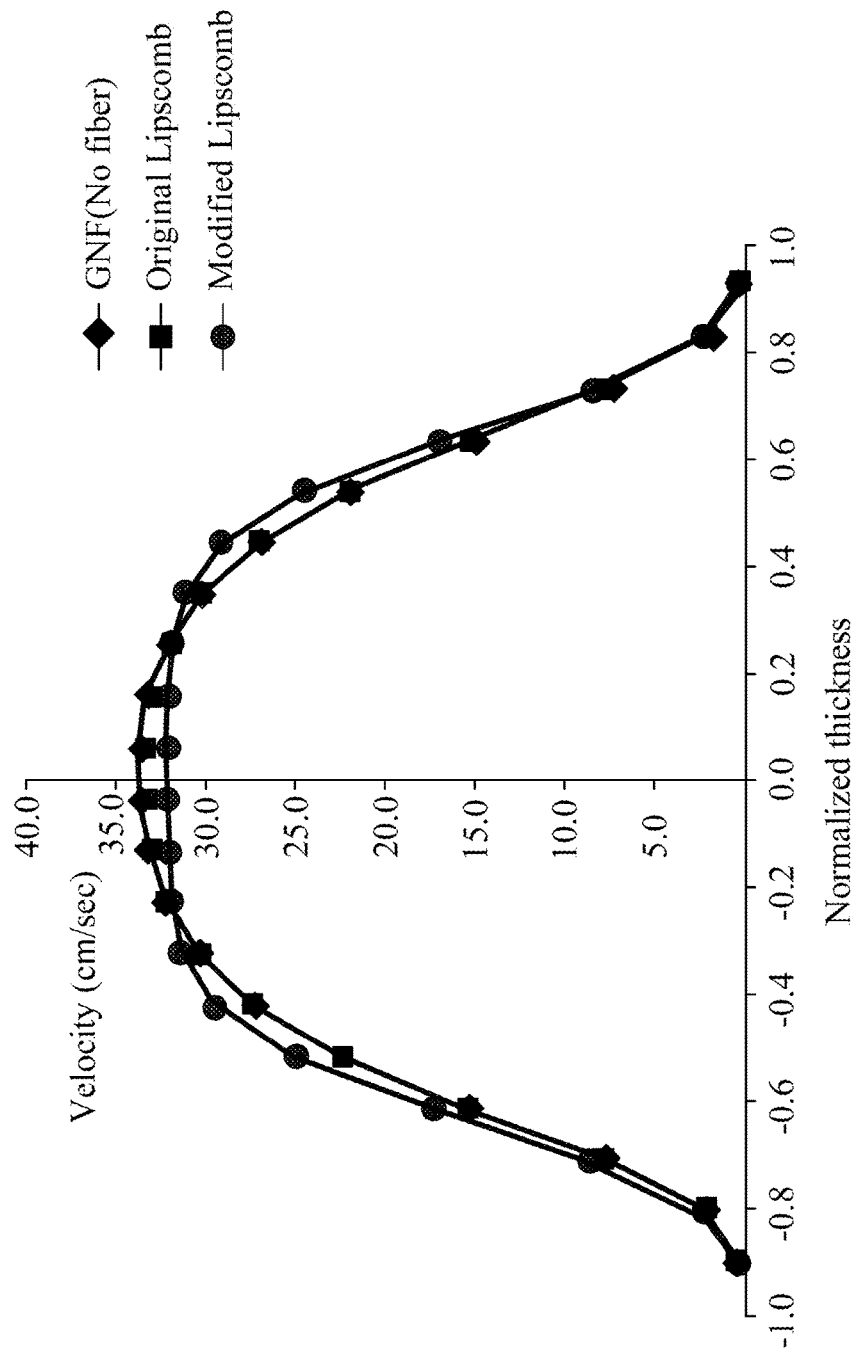
Figure 18:
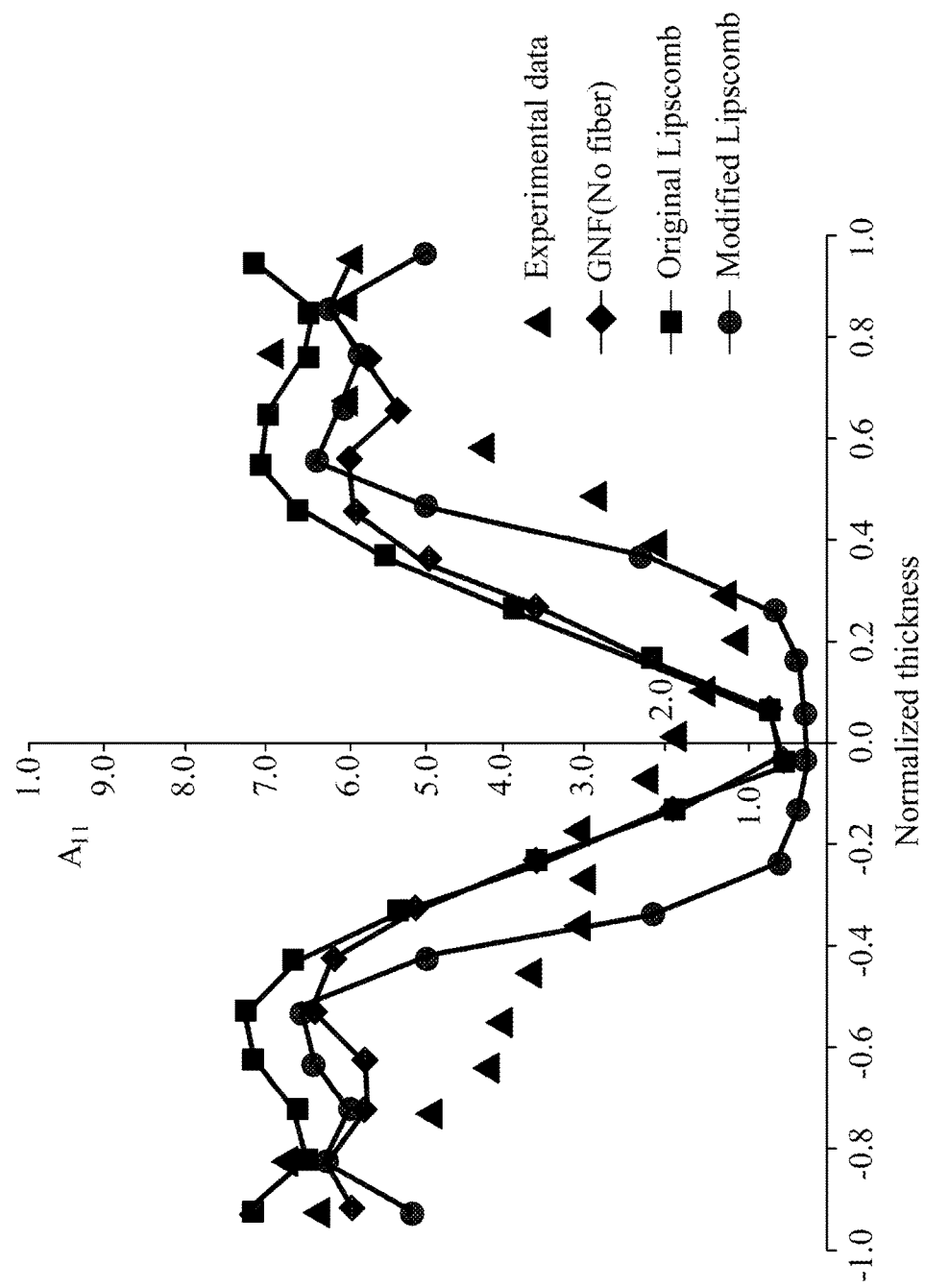

FIGS. 17 and 18 show the average velocity profile, and the flow-directional fiber orientation component ($A_{11}$) distribution, respectively, through a normalized thickness performed at the measurement point in FIG. 7 in accordance with some embodiments of the present disclosure.

Figure 19:
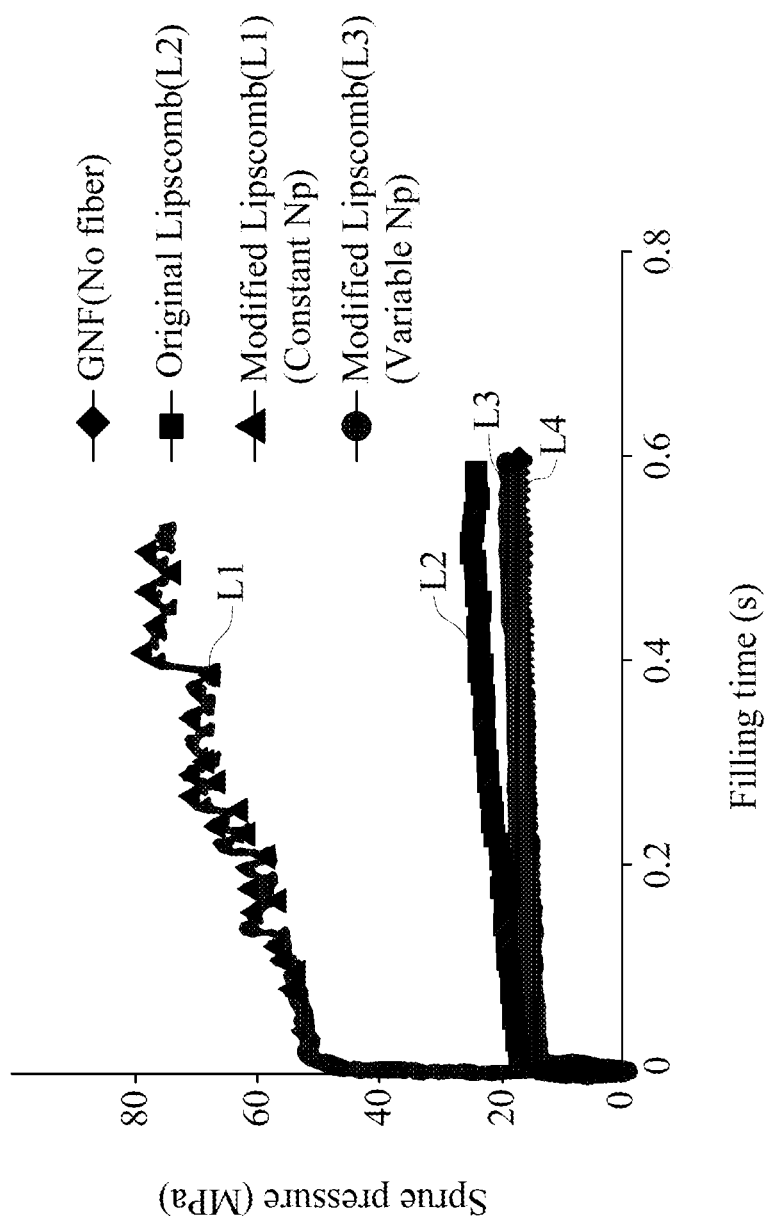

FIG. 19 shows changes in the sprue pressure with respect to the filling time for different stress tensor models in accordance with some embodiments of the present disclosure.

Figure 20:
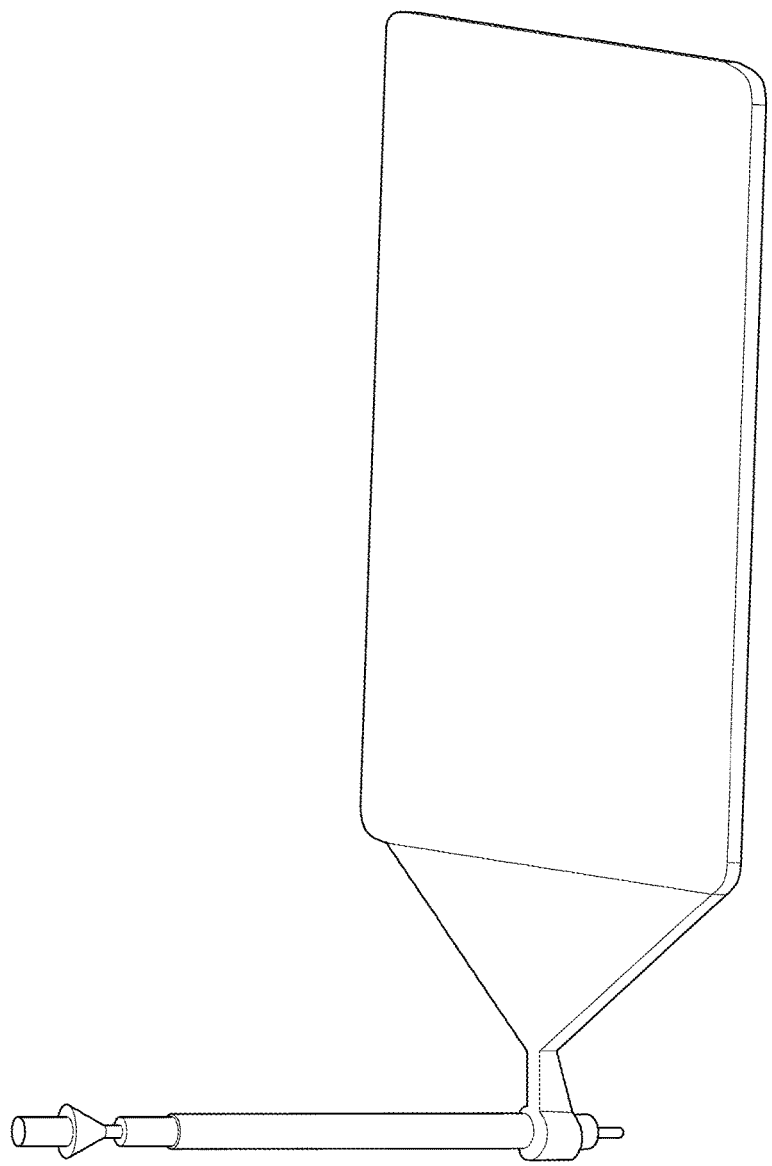

FIG. 20 is a schematic view showing the result of a simulated injection molding of an end-gated plate in accordance with some embodiments of the present disclosure.

Figure 21:
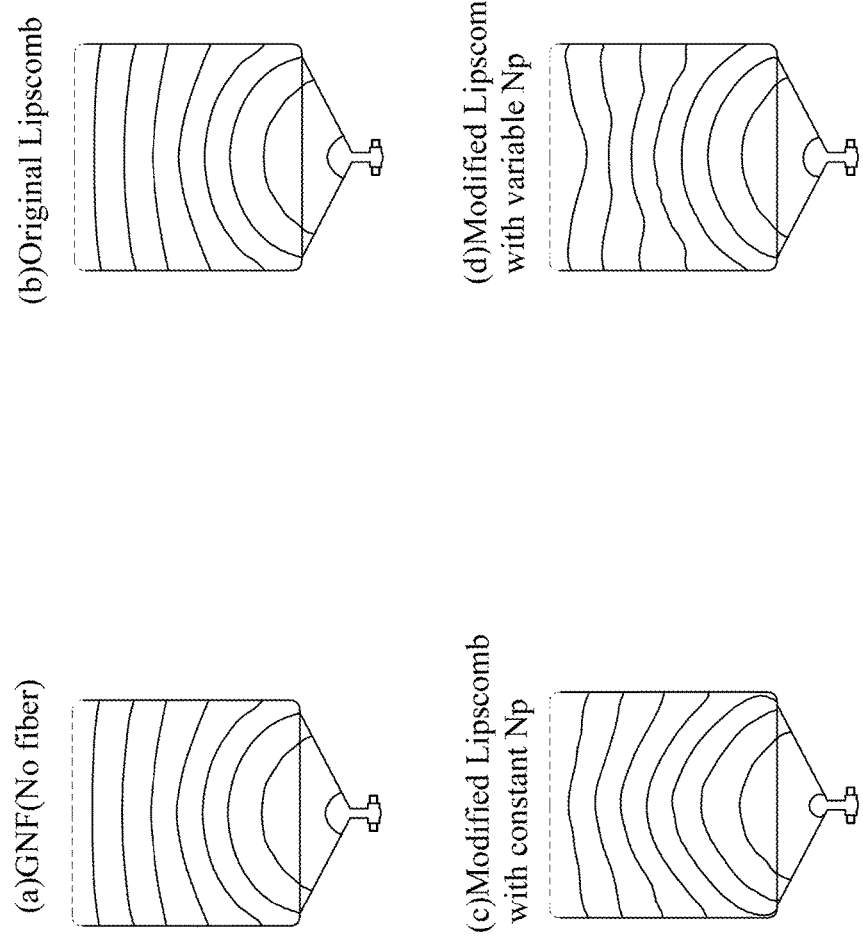

FIG. 21 shows the melt front of the simulated injection molding of the end-gated plate in FIG. 20 for different stress tensor models in accordance with some embodiments of the present disclosure.

DETAILED DESCRIPTION

The following description of the disclosure accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing a fiber-reinforced thermoplastic (FRT) composite article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

The FRT composite articles, produced by molding techniques such as injection molding, have assumed great importance in the manufacture of many products for their specific mechanical properties, including tensile strength, electrical conductivity, and other beneficial characteristics.

During a typical molding process of FRT composite articles, a composite molding resin, most often in the form of small beads or pellets, is transported to a molding machine that melts the resin beads under heat, pressure, and shear. The molten molding resin is forcefully injected into a mold cavity having a particular cavity shape. The injected molding resin is held under pressure in the mold cavity, cooled, and then removed as a solidified part having a shape that essentially duplicates the shape of the mold cavity.

The mechanical property of the molded article is correlated with the orientation distribution of the fibers. If the simulated orientation distribution of the fibers with the corresponding mechanical property does not meet the specification of the molded FRT article, the fiber parameters or the molding condition may be adjusted, and another simulation is performed to obtain an updated orientation distribution of the fibers in the composite molding resin while using the adjusted fiber parameter or the molding condition. In some embodiments, the molding condition includes the mold temperature, resin temperature, injection pressure, injection time (or speed), packing pressure, packing time, etc.

Studies show that the flow patterns of the composite molding resin are anisotropic and depend significantly on the orientation distribution of the fibers therein. For example, FIG. 1 is a schematic diagram illustrating two different flow patterns during injection molding processes of a pure resin (A) and a composite molding resin (B).

Figure 1:
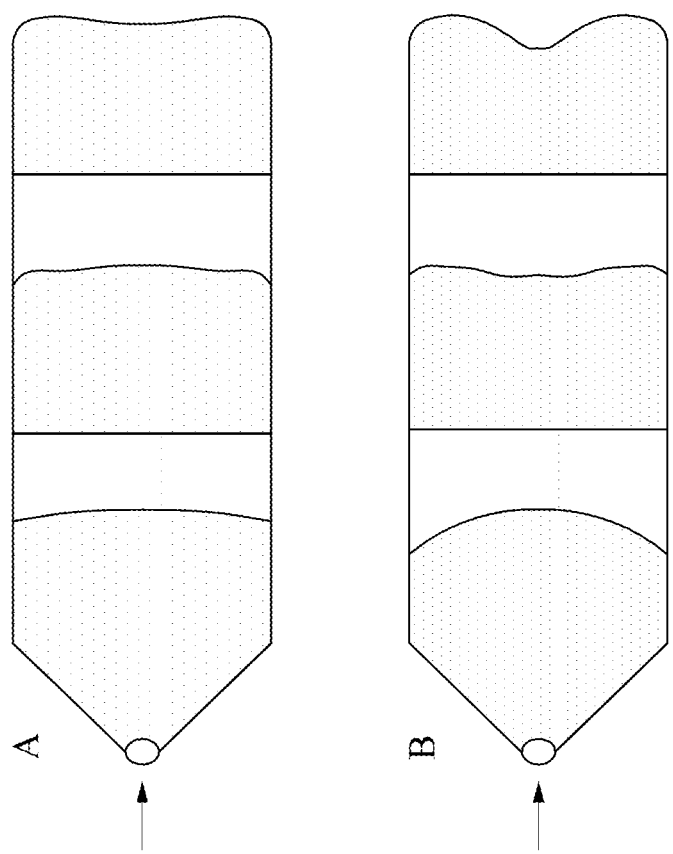
FIG. 1 is a schematic diagram illustrating two different flow patterns during two injection molding processes of a pure resin (A) and a composite molding resin (B).

Referring to FIG. 1, during the injection molding process of the pure resin (A), the injection molded melt front is typically smooth and continuous during the propagation of the free surface. In contrast, in the injection molding process of the composite molding resin (B), wherein the composite molding resin includes short/long FRT composites at high fiber concentrations, the free surface along the sidewalls of the mold cavity advances more quickly than the free surface in the center, and therefore the flow pattern is peculiar and irregular.

The flow patterns of the composite molding resin during a mold filling process play an important role in forming flow-induced fiber orientation distribution, while the flow patterns are in turn affected by the fiber orientation distribution. Previously, the pioneering researchers, including Lipscomb and others, developed a constitutive equation of dilute fiber suspensions (hereinafter referred to as the Lipscomb equation) to express the fiber orientation effect on the flow stress (See, Lipscomb II, Denn, Hur & Boger (1988). The flow of fiber suspensions in complex geometries. *Journal of Non-Newtonian Fluid Mechanics* 26 (3), 297-325, the entirety of which is incorporated herein by reference).

The Lipscomb equation provides:

$$\tau = 2\eta_m D + 2\eta_m \phi N_p D : A_4 \quad (1)$$

$$D = \frac{\nabla u + \nabla u^T}{2} \quad (2)$$

where $\tau$ is an extra stress tensor, $\eta_m$ is a shear viscosity tensor of the matrix melts, $\phi$ is a fiber volume fraction, $N_p$ is a dimensionless parameter of coupling flow-fiber for controlling anisotropic degree of the composite molding material), D is a rate-of-deformation tensor, u is a velocity vector, and $A_4$ is a fourth-order orientation tensor. The fourth-order orientation tensor $A_4$ is determined using a higher order polynomial closure approximation in terms of the second-order orientation tensor A, such as the Eigenvalue-Based Optimal Fitting (EBOF) Closure (See, VerWeyst (1998). Numerical predictions of flow-induced fiber orientation in three-dimensional geometries. Urbana-Champaign: Ph.D. Thesis, University of Illinois, the entirety of which is incorporated herein by reference) and the Invariant-Based Optimal Fitting (IBOF) Closure (See, Chung & Kwon (2002). Invariant-based optimal fitting closure approximation for the numerical prediction of flow-induced fiber orientation. *Journal of Rheology* 46(1), 169-194, the entirety of which is incorporated herein by reference). Moreover, $N_p=0$ indicates the decoupling calculation in absence of the fiber orientation effect.

The Lipscomb equation is an important equation for coupling flow stress and fiber orientation, and much research has been done based on this equation to simulate anisotropic flow patterns.

According to research by VerWeyst and Tucker (See, VerWeyst & Tucker (2002). Fiber Suspensions in Complex Geometries: Flow/Orientation Coupling. *Canadian J. Chem. Eng* 80, 1093-1106, the entirety of which is incorporated herein by reference), in injection molding simulations of a center-gated disk (for example, that shown in the schematic view of FIG. 7), since the radial velocity component distribution and the radial fiber orientation tensor component distribution both remain nearly completely unvarying while the coupling flow-fiber parameter, $N_p$, increases, the coupling of flow stress and fiber orientation distribution can be ignored in injection molding simulations.

However, when given large $N_p$ values, the Lipscomb equation frequently yields divergent numerical calculation results (for example, $N_p=20$ in FIG. 8), and, as a result, the anisotropic flow patterns still cannot be accurately predicted from the simulation results.

Therefore, one objective of the present disclosure is to propose a modification to the Lipscomb equation for the coupling flow-fiber calculation. Accordingly, this disclosure next seeks to explain why divergent numerical calculation results are produced when using large $N_P$ values.

Another objective of the present disclosure is to provide a molding system for preparing a fiber-reinforced thermoplastic (FRT) composite article using a computer-aided engineering (CAE) simulation with a modified Lipscomb equation.

The fourth-order orientation tensor $A_4$ (representing an orientation distribution of the fibers) can be expressed as the quadratic form of the second-order orientation tensor A as follows:

$$A_4 = AA \quad (3)$$

Consequently, the Lipscomb equation of equation (1) can be reduced as:

$$\tau = 2\eta_m D + 2\eta_m \phi N_p (D:A) A \quad (4)$$

In general, the symmetric rate-of-deformation tensor D (representing a rate of deformation of the molding material) and its components $d_{ij}$ for the injection molding flow field are assumed:

$$D = [d_{ij}] = \begin{bmatrix} -\dot{\varepsilon} & 0 & \dot{\gamma} \\ 0 & \dot{\varepsilon} & 0 \\ \dot{\gamma} & 0 & 0 \end{bmatrix} \quad (5)$$

where $\dot{\gamma}$ is shear rate and $\dot{\varepsilon}$ is extension rate.

The symmetric second-order orientation tensor A is defined:

$$A = [a_{ij}] = \begin{bmatrix} a_{11} & a_{12} & a_{13} \\ a_{12} & a_{22} & a_{23} \\ a_{13} & a_{23} & a_{33} \end{bmatrix} \quad (6)$$

In practice, the off-diagonal components ($a_{12}$, $a_{13}$, $a_{23}$) have very small values and can be ignored. Thus, the tensor A is:

$$A = \begin{bmatrix} a_{11} & 0 & 0 \\ 0 & a_{22} & 0 \\ 0 & 0 & a_{33} \end{bmatrix} \quad (7)$$

The D:A term is obtained:

$$D:A = tr(d_{ik}a_{kj}) = tr\begin{bmatrix} a_{11}\dot{\varepsilon} & 0 & a_{33}\dot{\gamma} \\ 0 & -a_{22}\dot{\varepsilon} & 0 \\ a_{11}\dot{\gamma} & 0 & 0 \end{bmatrix} = (a_{11} - a_{22})\dot{\varepsilon} \quad (8)$$

D, A, and the D:A term are substituted into the Lipscomb equation of equation (4):

$$\tau = 2\eta_m \begin{bmatrix} -\dot{\varepsilon} & 0 & \dot{\gamma} \\ 0 & \dot{\varepsilon} & 0 \\ \dot{\gamma} & 0 & 0 \end{bmatrix} + 2\eta_m \phi N_p(a_{11} - a_{22})\dot{\varepsilon} \begin{bmatrix} a_{11} & 0 & 0 \\ 0 & a_{22} & 0 \\ 0 & 0 & a_{33} \end{bmatrix} \quad (9)$$

When given a large $N_p$ value, the stress tensor τ should approximate the value of a nearly-full matrix as shown below:

$$\tau \approx \begin{bmatrix} \tau_{11} & 0 & \tau_{13} \\ 0 & \tau_{22} & 0 \\ \tau_{13} & 0 & \tau_{33} \end{bmatrix} \quad (10)$$

The above matrix also explains why the numerical calculation results of the Lipscomb equation with large $N_p$ value are divergent.

In summary, in the three decades since the Lipscomb equation was developed, prior state-of-the-art predictive engineering tools have always provided unsatisfactory simulation results of anisotropic flow patterns in injection molding of the FRT composite articles.

The present disclosure proposes a modified Lipscomb equation to describe the anisotropic stress distribution of the composite molding resin. The modified Lipscomb equation can be used to obtain convergent numerical calculation results even with large $N_p$ values and can therefore be used to successfully simulate anisotropic flow patterns of the composite molding material. As stated above, one objective of the present disclosure is to apply the modified Lipscomb equation in an injection molding system for preparing an FRT composite article.

In some embodiments, the anisotropic stress distribution of the composite molding resin is represented by the modified Lipscomb equation of the present disclosure:

$$\tau' = 2\eta'D + 2\eta'\phi N_p(\dot{\gamma})\left(\frac{D:A_4:D}{D:D}\right)D \quad (11)$$

where the second term has the same base tensor D (the rate-of-deformation tensor) as the first term.

In some embodiments, the equation (11) can be further expressed as follows:

$$\tau' = 2\eta'X_aD \quad (12)$$

$$X_a = 1 + \phi N_p(\dot{\gamma})\frac{D:A_4:D}{D:D} \quad (13)$$

where η' is a shear viscosity tensor of the composite molding material (mixing fiber-matrix melts), and is generated in homogeneous flow fields due to the presence of fibers. In addition, the dimensionless factor $X_a$ is defined as a degree of anisotropy of flow fields due to the fiber orientation and the fiber concentration.

Compared with the original Lipscomb equation (4), in which the base tensors of the first and second terms are D and A, the second base of the modified Lipscomb equation is replaced by the rate-of-deformation tensor D, so the constitutive equation of the stress tensor τ' is strongly related to the rate-of-deformation tensor D.

Assuming that the extension rate $\dot{\varepsilon}$ is much smaller than the shear rate $\dot{\gamma}$, i.e., $\dot{\gamma} \gg \dot{\varepsilon}$, the flow fields approach steady state, and therefore the rate-of-deformation tensor D can be expressed as:

$$D = \begin{bmatrix} 0 & 0 & \dot{\gamma} \\ 0 & 0 & 0 \\ \dot{\gamma} & 0 & 0 \end{bmatrix} \quad (14)$$

The stress tensor τ' should be assumed:

$$\tau' \approx \begin{bmatrix} 0 & 0 & \tau_{13} \\ 0 & 0 & 0 \\ \tau_{13} & 0 & 0 \end{bmatrix} \quad (15)$$

Due to the simple stress matrix in equation (15), the modified Lipscomb equation can be used to obtain convergent numerical calculation results even with a large $N_p$ value.

In addition, the coupling flow-fiber parameter $N_p$ of the Lipscomb equation is constant in order to directly control the effect of coupling flow-fiber on the entire flow fields, including the shear flow and the extension flow. However, applying a large $N_p$ value to the entire flow fields should result in a correspondingly super high sprue pressure.

Figure 2:
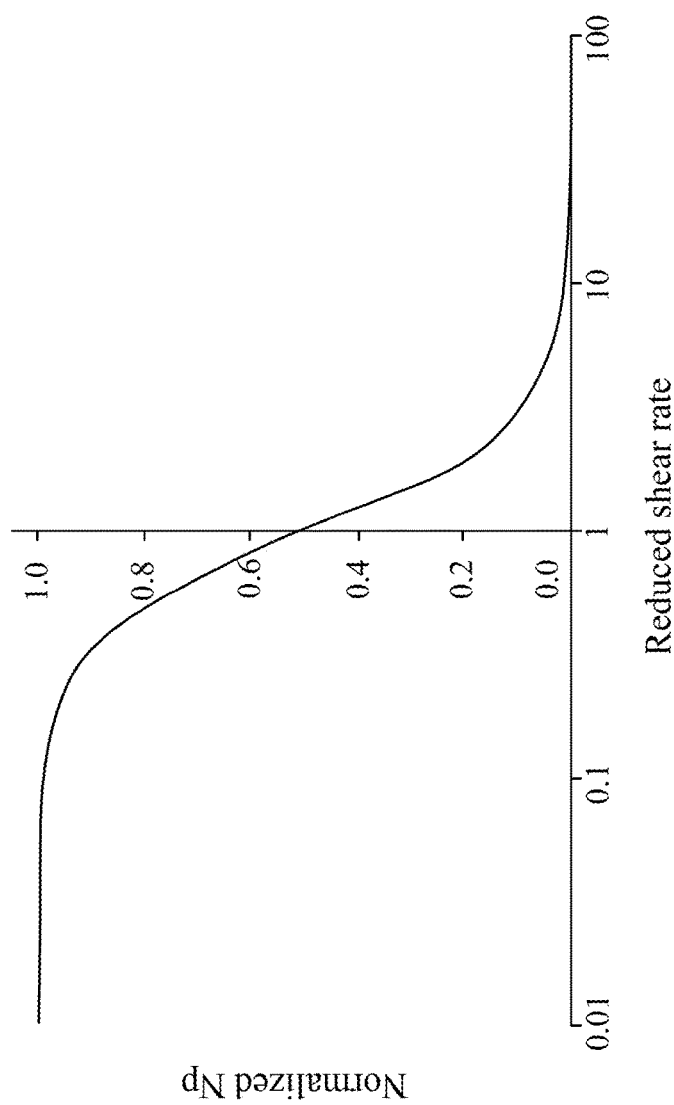
FIG. 2 is a diagram plotting a normalized $N_P$ against a reduced shear rate in accordance with some embodiments of the present disclosure.

To resolve such issue, the coupling flow-fiber parameter $N_p$ of the modified Lipscomb equation in the present disclosure is assumed to be dependent on the shear rate $\dot{\gamma}$. At low shear rates, the effect of coupling flow-fiber should be stronger, while at high shear rates, the effect of coupling flow-fiber should correspondingly be weaker. In addition, when the shear rate $\dot{\gamma}$ is decreased to a certain critical value, the coupling flow-fiber parameter $N_p$ remains almost unchanged with the shear rate $\dot{\gamma}$ and $N_p \approx 0$ occurring at high shear rates. Thus, in the present disclosure, a mathematical model of a shear-rate dependent variable $N_p(\dot{\gamma})$ is given:

$$\frac{N_P(\dot{\gamma})}{N_{P0}} = \frac{1}{1 + (\dot{\gamma}/\dot{\gamma}_c)^2} \quad (16)$$

where $N_{P0}$ is the initial $N_P$ value and $\dot{\gamma}_c$ is the critical shear rate. The normalized $$N_P\left(\frac{N_P(\dot{\gamma})}{N_{P0}}\right)$$

is plotted against the reduced shear rate ($\dot{\gamma}/\dot{\gamma}_c$) in FIG. 2. Significantly, the shear-rate dependent $N_p(\dot{\gamma})$ is crucial to improve the over-prediction of sprue pressure and control the occurrence of anisotropic flow patterns.

One objective of the present disclosure is to apply the modified Lipscomb equation in injection molding simulation operations performed in an injection molding system for preparing a complex 3D geometrical FRT composite article.

Figure 3:
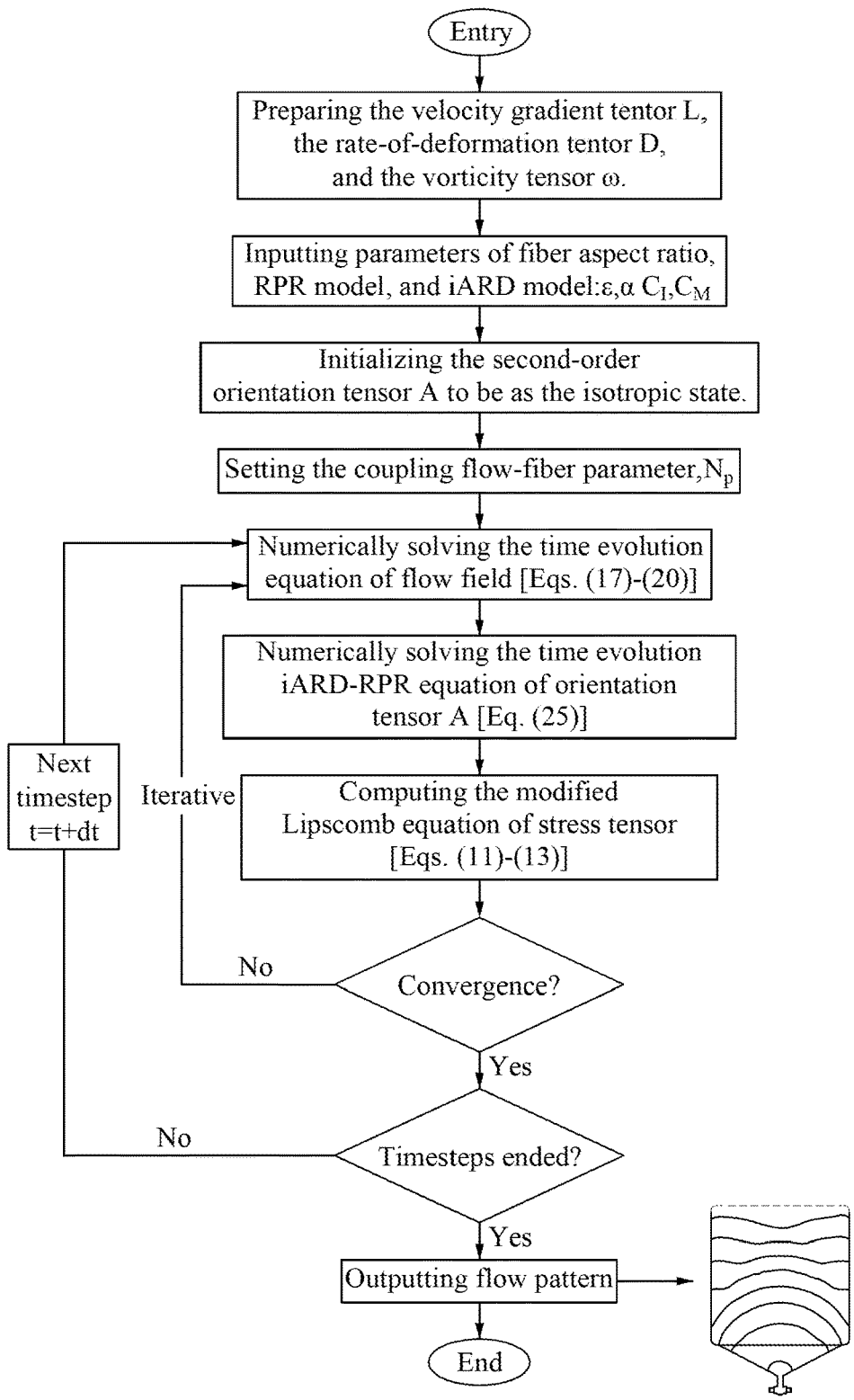
FIG. 3 is a flowchart showing an integration of a modified Lipscomb equation and CAE simulation software in accordance with some embodiments of the present disclosure.

FIG. 3 is a flowchart showing an integration of the modified Lipscomb equation and CAE simulation software in accordance with some embodiments of the present disclosure. As shown in FIG. 3, the CAE simulation software can compute the stress tensor τ by applying the modified Lipscomb equation for the subsequent fiber orientation distribution analysis. In addition, after computing the stress tensor τ, if the numerical calculation results are not convergent, the fiber parameters or the molding conditions may be adjusted, and another simulation can be performed to obtain updated new calculation results. By applying the modified Lipscomb equation, the orientation distribution of the fibers can be accurately predicted.

Still referring to FIG. 3, in injection molding simulation operations, the governing equations of the fluid mechanics which describe the transient flow motions are as follows:

$$\frac{\partial \rho}{\partial t} + \nabla \cdot \rho u = 0 \tag{17}$$

$$\frac{\partial}{\partial t}(\rho u) + \nabla \cdot (\rho u u - \sigma) = \nabla \cdot \sigma + \rho g \tag{18}$$

$$\sigma = -pI + \tau \tag{19}$$

$$\rho C_P\left[\frac{\partial T}{\partial t} + u \cdot \nabla T\right] = \nabla \cdot (k \nabla T) + \eta \dot{\gamma}^2 \tag{20}$$

Where ρ is density, t is time, u is velocity vector, σ and τ are total stress tensor and deviatoric stress tensor, respectively, g is acceleration vector of gravity, p is pressure, η is isotropic viscosity, $C_P$ is specific heat, T is temperature, k is thermal conductivity, and $\dot{\gamma}$ is shear rate.

Solving the governing equations (17)-(20) requires a transient state analysis, which can be performed numerically using a computer. See, for example, Rong-yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives $$\left(\frac{\partial}{\partial t}\right)$$

in the governing equations (17)-(20) are not considered zero.

The true 3D Finite Volume Method (FVM) is employed due to its robustness and efficiency to solve the transient flow fields in a complex 3D geometrical FRT composite article. In some embodiments of the present disclosure, a modified Lipscomb equation can be implemented in a commercial injection molding simulation software, Moldex3D (CoreTech System Co. of Taiwan), to facilitate the fiber orientation predictions.

The flow curves of shear viscosity dominate the flow behaviors for a variety of materials. Commonly, the Cross-William-Landel-Ferry (Cross-WLF) model (See, Cross (1979). Relation between viscoelasticity and shear-thinning behavior in liquids. *Rheology Acta*, 18(5), 609-614, the entirety of which is incorporated herein by reference) used in polymer rheology and processing can describe complex viscosity behaviors, including the viscosity η($\dot{\gamma}$, T, P) varying with shear rate $\dot{\gamma}$ for the Cross model and the zero-shear-rate viscosity $n_0$(T, P) depending on temperature T and pressure P for the WLF model, as follows:

$$\eta(\dot{\gamma}, T, P) = \frac{\eta_0(T, P)}{1 + \left(\frac{\eta_0 \dot{\gamma}}{\tau^*}\right)^{1-n}} \tag{21}$$

$$\eta_0(T, P) = D_1 \exp\left[\frac{-A_1(T - T_C)}{A_2 + (T - T_C)}\right] \tag{22}$$

$$T_C = D_2 + D_3 P \tag{23}$$

$$A_2 = \widetilde{A_2} + D_3 P \tag{24}$$

where seven parameters are set by related experimental data, including n, τ*, $\widetilde{A_2}$, $A_2$, $D_1$, $D_2$ and $D_3$.

Recently, Tseng et al. developed a new fiber orientation model to couple with Jeffery's hydrodynamic (HD) model, namely, the iARD-RPR model (known as the Improved Anisotropic Rotary Diffusion model combined with the Retarding Principal Rate model) with three parameters, $$\dot{A} = \dot{A}_{HD} + \dot{A}_{HD}(C_I, C_M) + \dot{A}_{RPR}(\alpha) \tag{25}$$

where $\dot{A}$ represents the material derivative of the tensor A. Parameters $C_I$ and $C_M$ describe the fiber-fiber interaction and fiber-matrix interaction, while parameter a can slow a response of the fiber orientation (See, U.S. Pat. No. 9,862,133 B1, the entirety of which is incorporated herein by reference).

Figure 4:
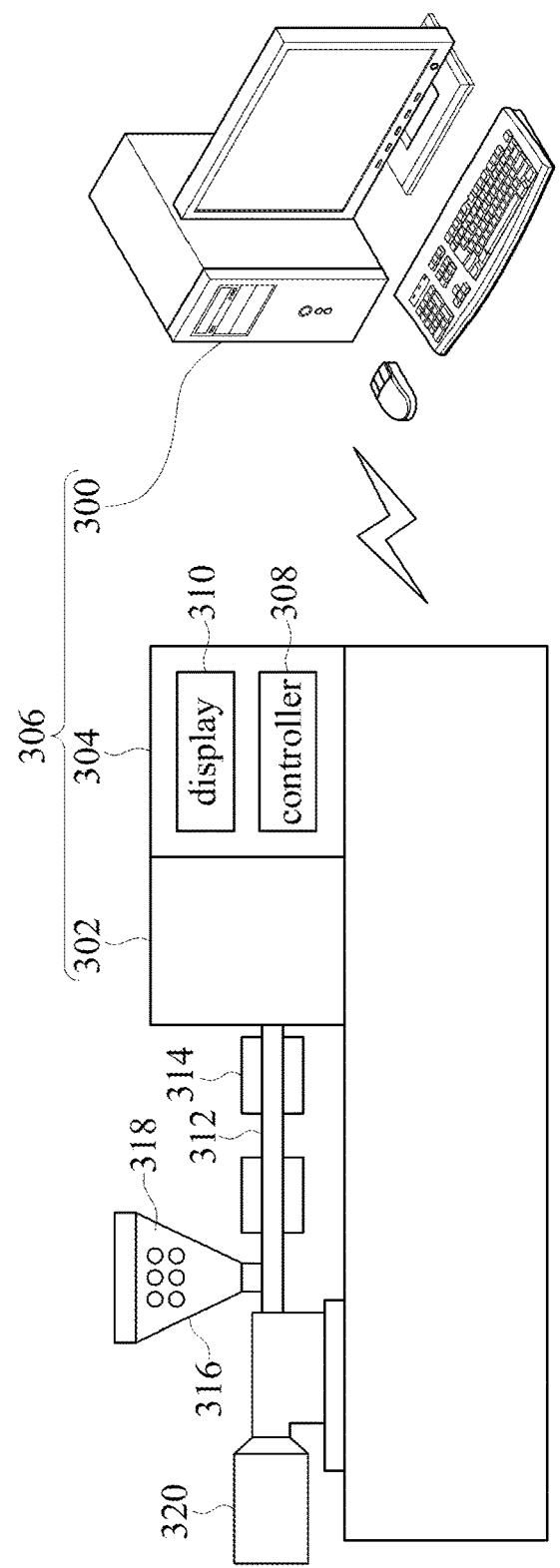
FIG. 4 is a schematic view of an injection molding system in accordance with various embodiments of the present disclosure.
Figure 5:
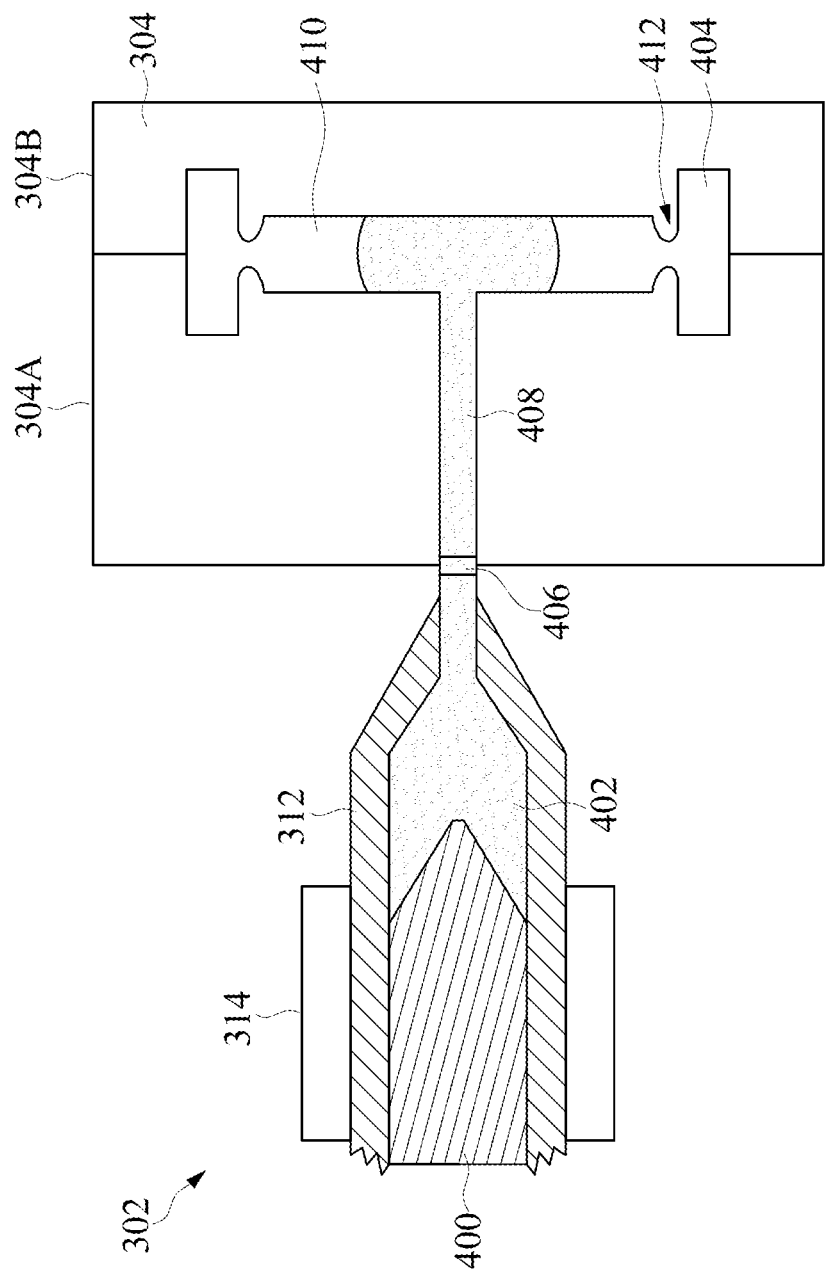
FIG. 5 is a close-up schematic view of a portion of a mold in FIG. 4 in accordance with some embodiments of the present disclosure.

Referring to FIGS. 4 and 5, FIG. 4 is a schematic view of an injection molding system 306 in accordance with various embodiments of the present disclosure. FIG. 5 is a close-up schematic view of a portion of the mold 304 in FIG. 4 in accordance with some embodiments of the present disclosure.

Referring to FIG. 4, the injection molding system 306 comprises an injection molding machine 302, a mold 304 disposed on the injection molding machine 302, and a computing apparatus 300 connected to the injection molding machine 302.

In some embodiments of the present disclosure, the injection molding system 306 further comprises a controller 308 connected to the computing apparatus 306 and configured to control the operation of the injection molding machine 302. In some embodiments of the present disclosure, the injection molding system 306 further comprises a display 310 configured to visually represent information of an injection molding process, such as simulation molding results.

In some embodiments of the present disclosure, the computing apparatus 306 is configured to perform CAE molding simulation operations, such as those described in the flowchart of FIG. 3, and transmit simulation results, such as molding conditions, to the injection molding machine 302 (or the controller 308) through a connection there between, such as a hardwired connection or a wireless coupling. Next, the injection molding machine 302 takes into account the simulation molding results transmitted from the computing apparatus 306, and performs an actual injection molding process to produce the FRT composite article.

In some embodiments of the present disclosure, the injection molding machine 302 includes a screw chamber 312, heating elements 314 configured to heat the screw chamber 312, a hopper 316 configured to hold composite pellets 318, and a screw-driving motor 320.

In some embodiments of the present disclosure, the composite pellets 318 include a polymeric material having a plurality of fibers therein. In some embodiments of the present disclosure, the polymeric material is PP (Polypropylene), PBT (Polybutylene terephthalate), nylon, or PC (Polycarbonate). In some embodiments of the present disclosure, the fibers are glass fibers or carbon fiber.

In some embodiments of the present disclosure, the composite pellets 318 are grouped into two categories based on fiber length: short fiber-reinforced thermoplastics (SFRTs) with a fiber length of about 0.2 to 0.4 mm, and long fiber-reinforced thermoplastics (LFRTs) having a fiber length of about 10 to 13 mm. LFRTs can yield continuous-fiber reinforcement. LFRT pellets are more extensively employed in automotive industrial fabrication than SFRT pellets.

Referring to FIG. 5, in some embodiments of the present disclosure, the injection molding machine 302 further includes a screw 400 positioned in the screw chamber 312 and driven by the screw-driving motor 320 for feeding composite molding resins 402, such as thermoplastics, into a mold cavity 404 of the mold 304 via a nozzle 406.

In some embodiments of the present disclosure, the molding machine 302 is equipped with sensors for sensing the velocity of the screw 400, the pressure of the screw chamber 312 (the filling pressure in the filling stage and the packing pressure in the packing stage), and the temperature of the screw chamber 312 (the filling temperature in the filling stage and the packing temperature in the packing stage).

In some embodiments of the present disclosure, the mold 304 includes a fixed-side mold 304A and a movable-side mold 304B. Furthermore, inside the mold 304, a sprue portion 408, a runner portion 410, a gate portion 412 and the mold cavity 404 are formed so as to be arranged in the above-mentioned order from the injection molding machine 10. The sprue portion 408 of the mold 304 is connected to the screw chamber 312 via the nozzle 406.

In some embodiments of the present disclosure, the screw-driving motor 320 includes an electric motor, a hydraulic actuator, or a combination thereof; in addition, the screw-driving motor 320 is configured to, in response to control signals from the controller 308, rotate the screw 400 and move the screw 400 toward the nozzle 406 so as to transfer the composite molding resins 402 into the sprue portion 408 of the mold 304.

Figure 6:
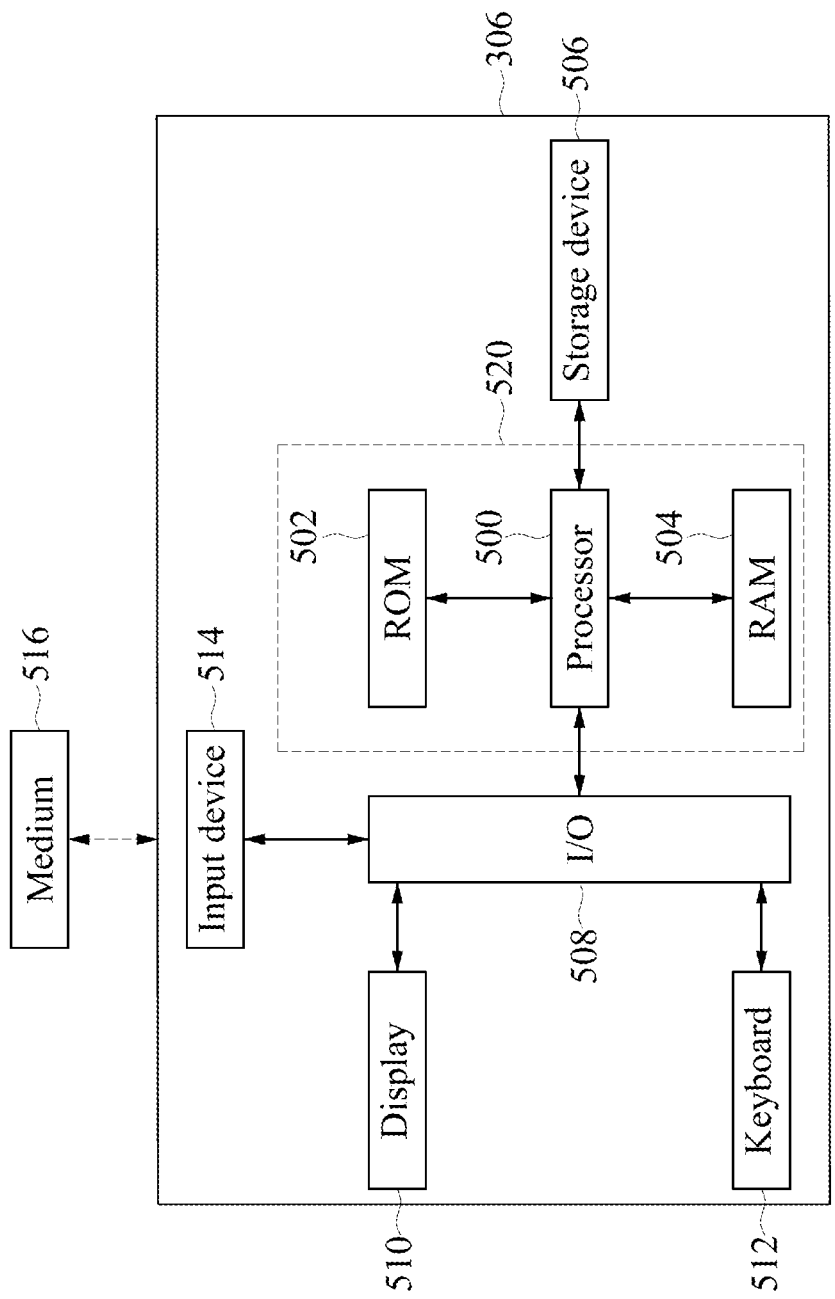
FIG. 6 is a functional block diagram of the computing apparatus in FIG. 4 in accordance with some embodiments of the present disclosure.

FIG. 6 is a functional block diagram of the computing apparatus 306 in FIG. 4 in accordance with some embodiments of the present disclosure. The computing apparatus 306 comprises a processing module 520 for executing CAE simulation software. In some embodiments of the present disclosure, the processing module 520 includes a processor 500, a read-only memory (ROM) 502, and a random access memory (RAM) 504. In some embodiments of the present disclosure, the computing apparatus 306 further comprises a storage device 506, and an input/output (I/O) interface 508.

The processor 500 operably communicates with the ROM 502, the RAM 504, the storage device 506, and the I/O interface 508.

In some embodiments of the present disclosure, the computing apparatus 306 may further include a display 510, a keyboard 512, and an input device 514, such as a card reader or an optical disk drive. The input device 514 is configured to input computer instructions (software algorithms) stored in a non-transitory computer-readable medium 516, and the processor 500 is configured to execute the computer instructions for performing the CAE molding simulation operations according to the computer instructions.

In some embodiments of the present disclosure, the processor 500 reads the software algorithms from the input device 514 or the storage device 506, executes the calculation steps, and stores the calculated result in the RAM 504. In some embodiments of the present disclosure, the memory devices, i.e., the ROM 502 and the RAM 504, can be programmed to store codes for performing the CAE molding simulation operations.

In the CAE molding simulation operations, a virtual molding, i.e., the computer-implemented molding simulation using CAE simulation software, is performed by the computing apparatus 306 for the molding process. The simulation results, such as molding conditions, are then set based on the virtual molding and transmitted to the controller 308. In virtual molding using CAE simulation software, molding phenomena occur in the mold cavity 404 within a short period of time, and the result of the simulation on composite molding resin temperature, pressure, shear rate, etc. can be observed.

The modified Lipscomb equation proposed in the present disclosure can be applied in the CAE molding simulation operations. The modified Lipscomb equation can be used to obtain convergent numerical calculation results even with large $N_p$ values and can successfully simulate anisotropic flow patterns. Consequently, the molding system of the present disclosure can accurately predict the fiber orientation distribution.

FIG. 7 is a schematic view of an injection molding simulation of a center-gated disk in accordance with some embodiments of the present disclosure. The polypropylene matrix including 40 percent by weight long glass fiber immersed therein (denoted as 40 wt % LGF/PP fluid) is used.

Figure 8:
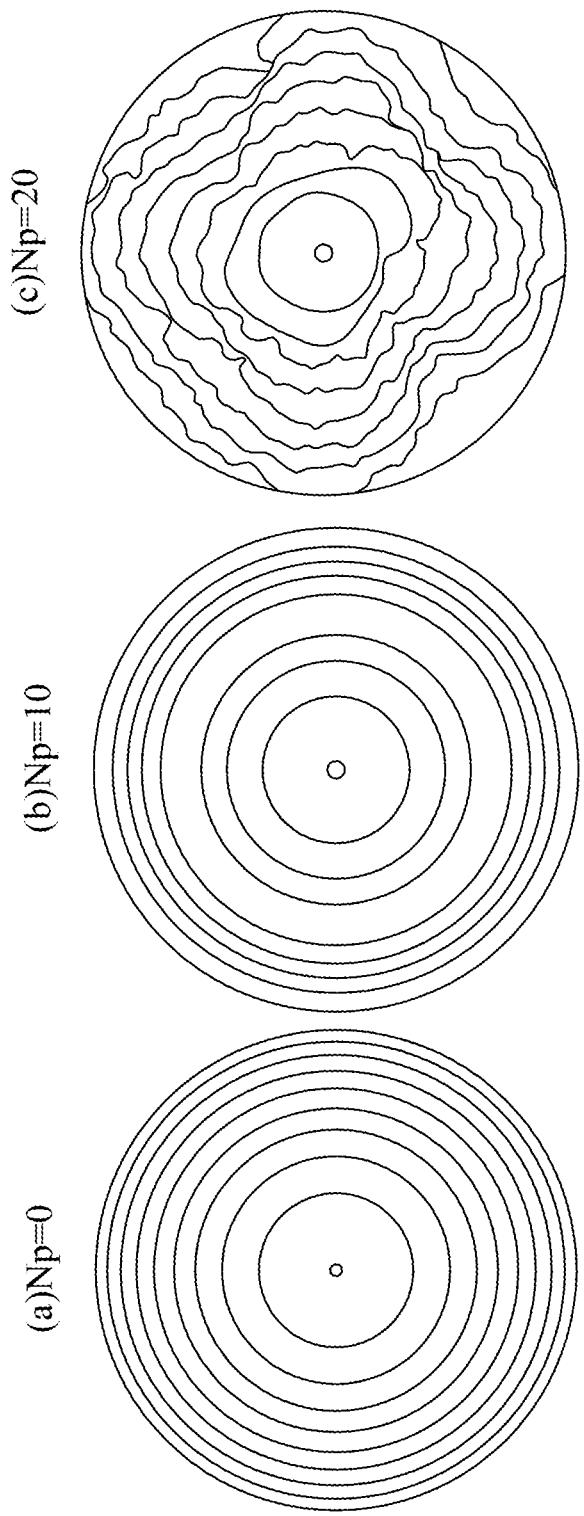
FIG. 8 shows the melt front of the center-gated disk flow in FIG. 7 at different $N_p$ values of the Lipscomb equation in accordance with some embodiments of the present disclosure.
Figure 9:
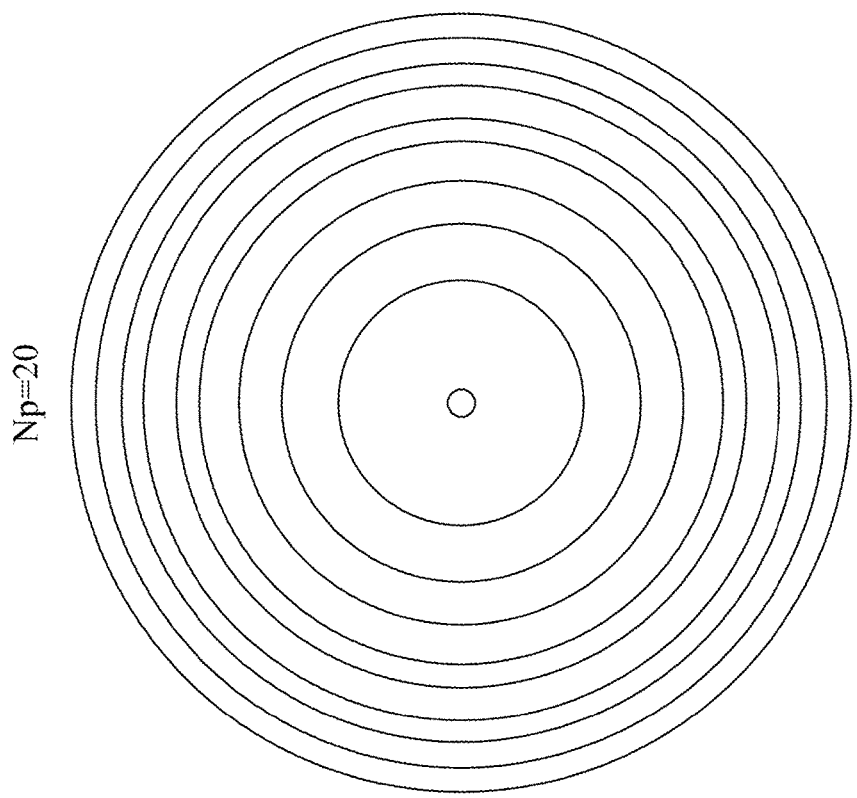
FIG. 9 shows melt fronts of the center-gated disk flow in FIG. 7 for the modified Lipscomb equation with $N_p=20$ in accordance with some embodiments of the present disclosure.

First, the commercial injection molding simulation software, Moldex3D (CoreTech System Co. of Taiwan), was used to simulate the center-gated disk flow for the 40 wt % LGF/PP fluid, and then the Lipscomb equation was examined at different $N_p$ values, including $N_p=0$, 10, and 20, as shown in FIG. 8. FIG. 8 shows the melt front of the center-gated disk flow in FIG. 7 at different $N_p$ values of the Lipscomb equation. It should be understood that the outer circles in FIG. 8 represent the earlier melt fronts and the inner ones represent the later melt fronts. In image (a) of FIG. 8, when given $N_p=0$, the Lipscomb stress becomes the General Newtonian Fluid (GNF) stress, i.e., the decoupling calculation in absence of the fiber orientation effect. The perfect circle-shape melt front of the isotropic flow patterns was found for the decoupling result ($N_p=0$) shown in image (a) of FIG. 8 and the coupling result using $N_p=10$ shown in image (b) of FIG. 8. However, a divergent calculation occurs when the model is given a large $N_p$ value ($N_p=20$) as shown in image (c) of FIG. 8.

The modified Lipscomb equation proposed in this disclosure was used with $N_p=20$ for the center-gated flow. Consequently, the perfect circle-shape melt front is found in FIG.

Figure 10:
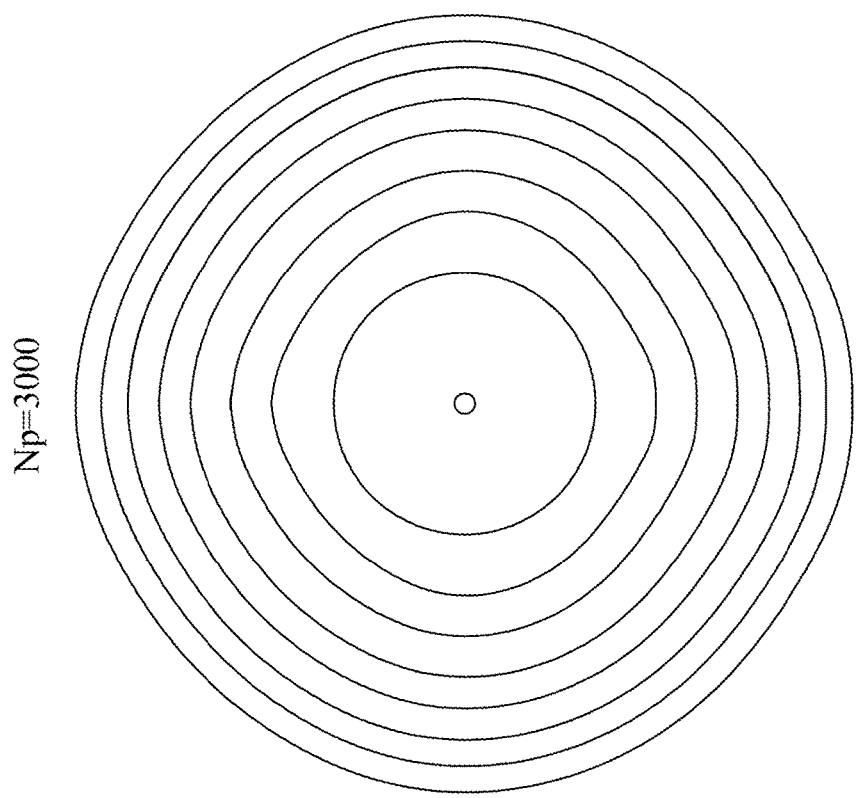
FIG. 10 shows melt fronts of the center-gated disk flow in FIG. 7 for the modified Lipscomb equation with $N_p=3000$ in accordance with some embodiments of the present disclosure.
Figure 11:
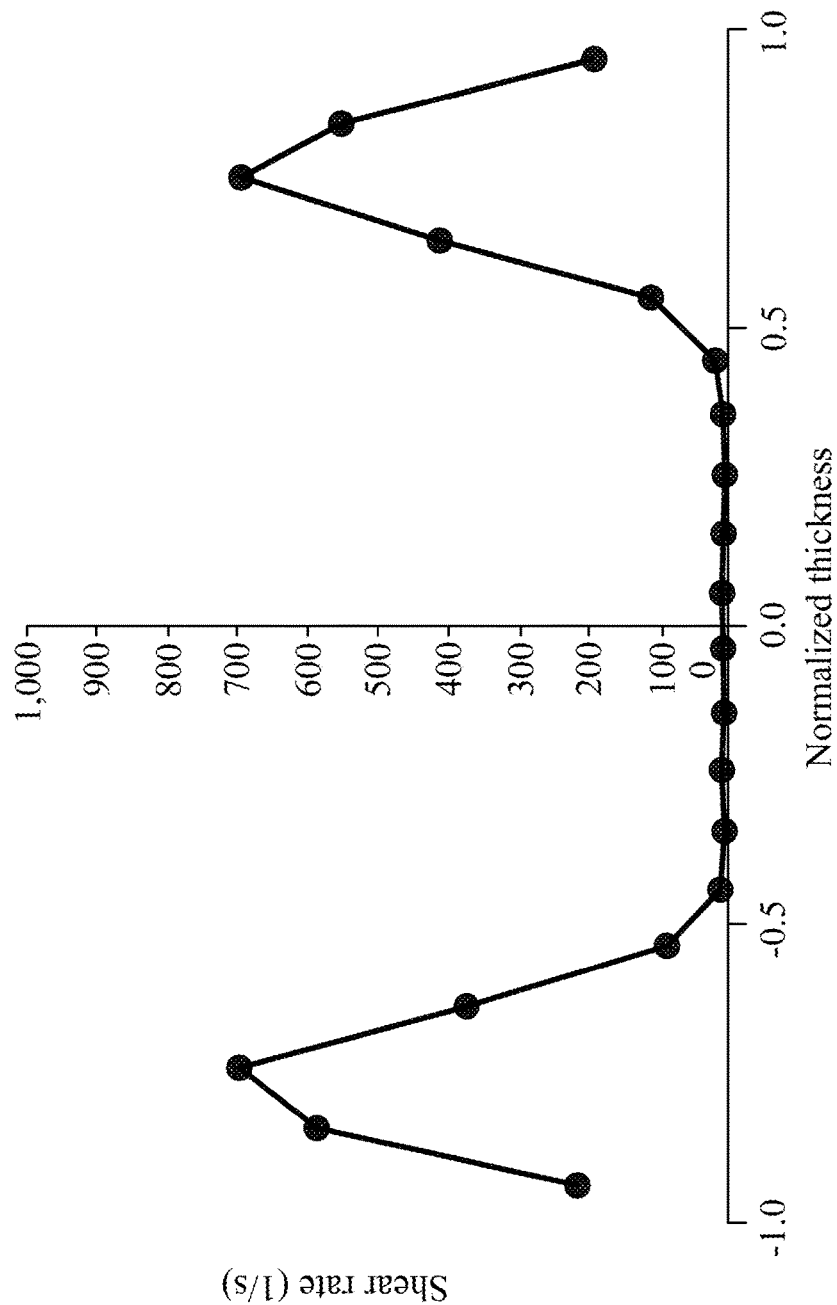
FIGS. 11 to 16 show a shear rate distribution, the fiber's shear rate distribution ($\dot{\gamma}_F^2 = D:A_4:D$), the resin's shear rate distribution ($\dot{\gamma}_R^2 = D:D$), the ratio of the fiber's shear rate to the resin's shear rate $$\left(\left(\frac{\dot{\gamma}_F}{\dot{\gamma}_R}\right)^2 = \frac{D:A_4:D}{D:D}\right),$$
Figure 12:
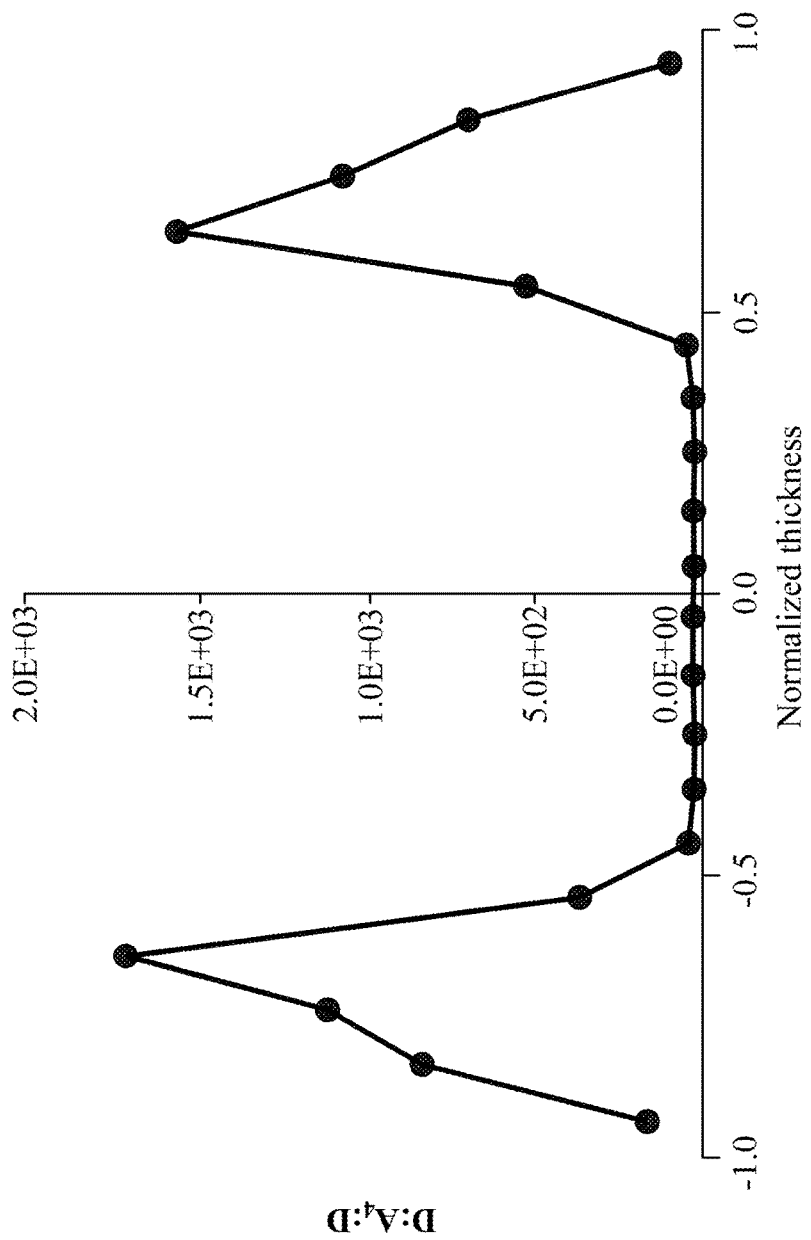
Figure 13:
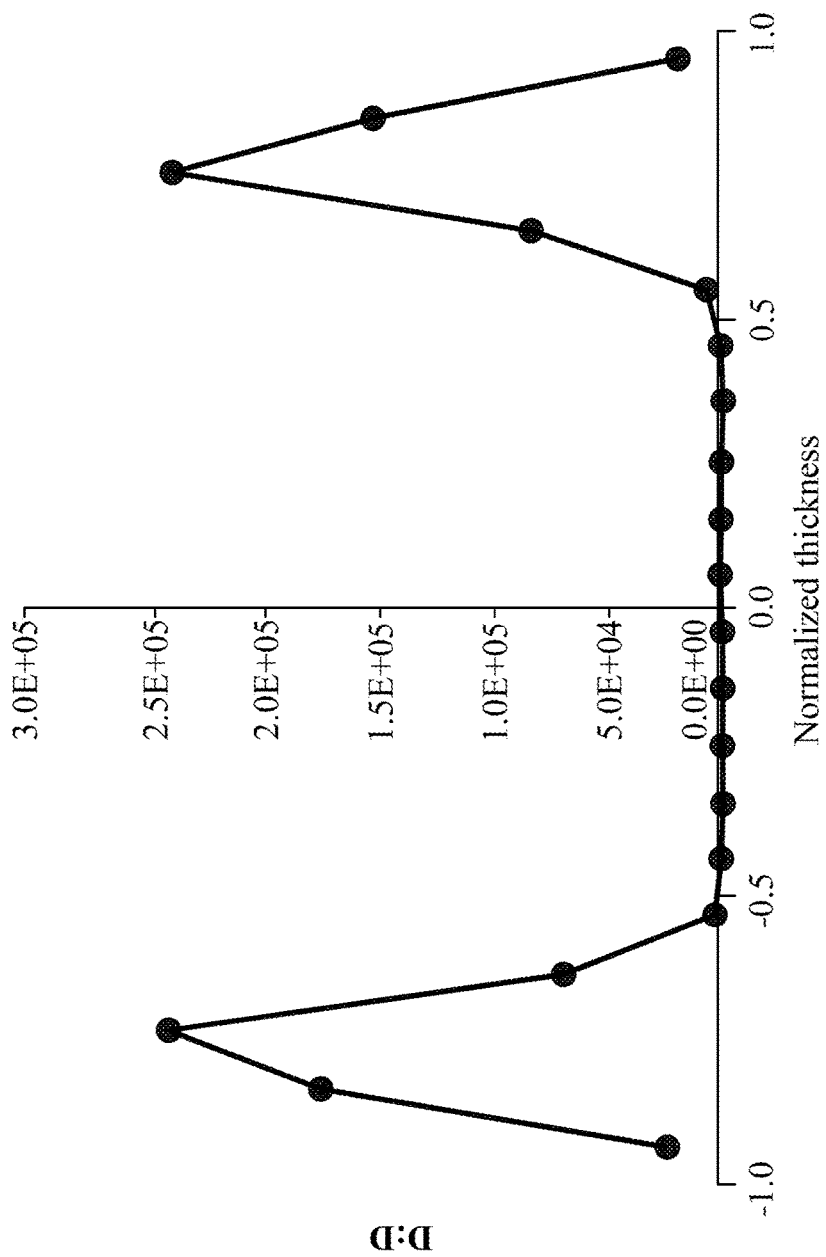
Figure 14:
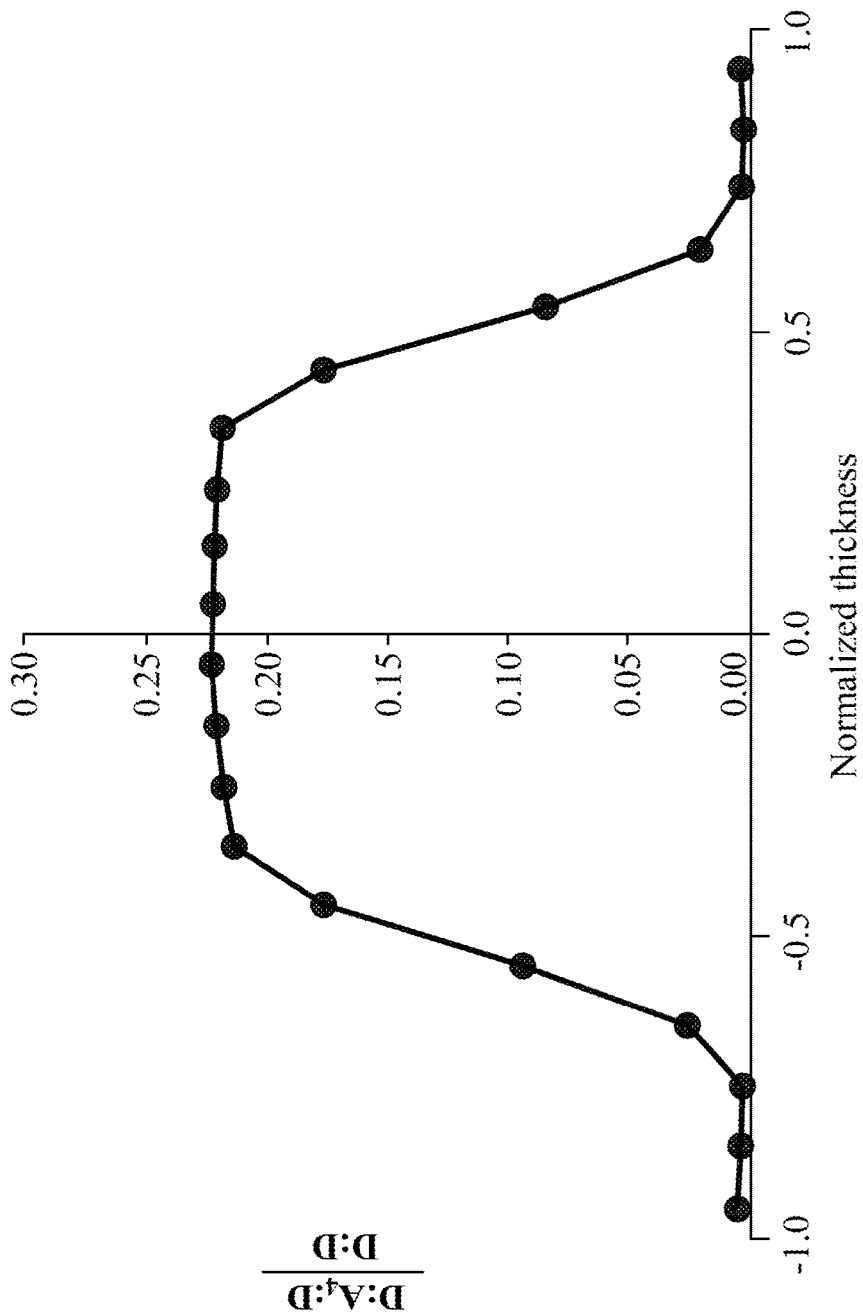
Figure 15:
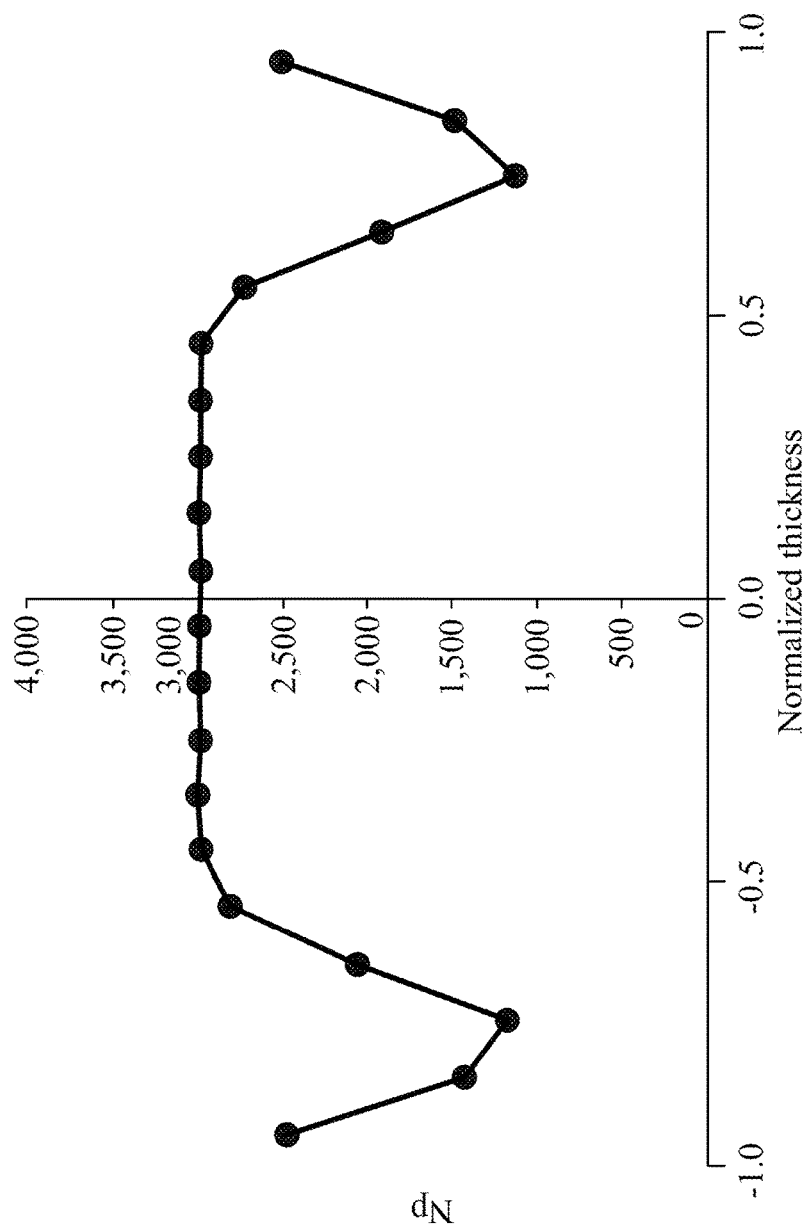
Figure 16:
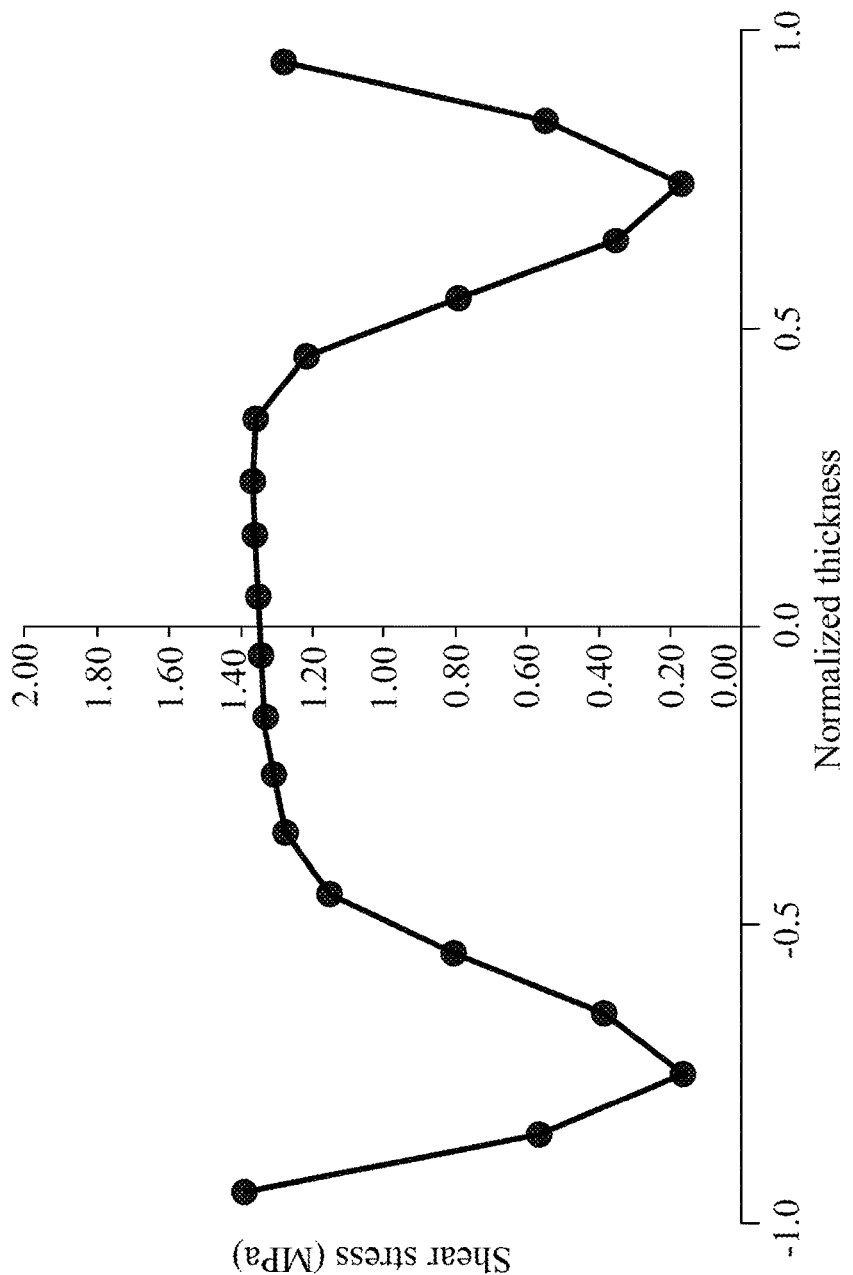

9. With a larger $N_p$ value, for example $N_p=3000$, the shape of the melt front begins to resemble a rectangle having anisotropic flow, as shown in FIG. 10.

Such result clearly demonstrates that the modified Lipscomb equation can be used to obtain convergent numerical calculation results even with large $N_p$ values, and can be used to successfully simulate anisotropic flow patterns.

FIGS. 11 to 16 show a shear rate distribution, the fiber's shear rate distribution (D:$A_4$:D), the resin's shear rate distribution (D:D), the ratio of the fiber's shear rate to the resin's shear rate (D:$A_4$:D/D:D), the coupling flow-fiber parameter ($N_p$), the shear stress distribution, respectively, through a normalized thickness performed at the measurement point in FIG. 7 in accordance with some embodiments of the present disclosure. The distributions shown in FIGS. 11 to 16 are obtained by using the modified Lipscomb equation proposed in this disclosure.

FIGS. 17 and 18 show the average velocity profile, and the flow-directional fiber orientation component ($A_{11}$) distribution, respectively, through a normalized thickness performed at the measurement point in FIG. 7 in accordance with some embodiments of the present disclosure. The distributions shown in FIGS. 17 and 18 are obtained by using the modified Lipscomb equation proposed in this disclosure.

As shown in FIG. 17, the numerical calculation results demonstrate the existence of a flat-parabolic velocity profile for the modified Lipscomb equation proposed in the present disclosure, while the General Newtonian Fluid (GNF) with no fiber and the original Lipscomb equation exhibit the narrow parabolic profile.

In FIG. 18, the broader core region of the flow-directional fiber orientation component ($A_{11}$) predicted by the modified Lipscomb equation is close to the experimental data. Therefore, both the flat-parabolic velocity profile and the broader core region of flow-directional fiber orientation component ($A_{11}$) exhibit significant anisotropic flow characteristics for injection molding of FRT composite articles.

FIG. 19 shows changes of the sprue pressure with respect to filling time for different stress tensor models. Notably, using the modified Lipscomb equation with a constant $N_p$ parameter to simulate anisotropic flow patterns yields an unusual sprue pressure. Therefore, the parameter $N_p$ is assumed to be dependent on the shear rate $\dot{\gamma}$, and the mathematical model of the shear-rate dependent variable $N_p(\dot{\gamma})$ is proposed in equation (16). The shear-rate dependent variable $N_P(\dot{\gamma})$ can be used to effectively reduce a high pressure, and can be used to obtain a reasonable value that is close to that predicted by the General Newtonian Fluid (GNF) calculation. Thus, the shear-rate dependent variable $N_P(\dot{\gamma})$, when given large initial values, is key to reducing the overestimation of predicted sprue pressure and controlling the occurrence of anisotropic flow.

FIG. 20 is a schematic view of the result of a simulated injection molding of an end-gated plate in accordance with some embodiments of the present disclosure. The modified Lipscomb equation was used to perform the simulated injection molding of the end-gated plate in FIG. 20. The predicted melt fronts of the end-gated plate flow for different stress tensor models are shown in FIG. 21. Significantly, the modified Lipscomb equation with the shear-rate dependent variable $N_P(\dot{\gamma})$ can be used to successfully simulate the anisotropic flow patterns. Other models, including the General Newtonian Fluid (GNF) calculation, the original Lipscomb equation and the modified Lipscomb equation with the constant $N_P$, are not able to provide such a natural flow phenomenon simulation.

In the present disclosure, a model of a stress tensor is proposed for easily obtaining convergent numerical results and successfully simulating anisotropic flow patterns in an injection molding simulation. As stated above, the ultimate aim of the present disclosure is to apply this model in simulation operations performed in the injection molding system for preparing a complex 3D geometrical FRT composite article.

The present disclosure provides a molding system for preparing a fiber-reinforced thermoplastic composite article. The molding system comprises: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an anisotropic rotational diffusion effect of the fibers in the composite molding material; and a controller coupled to the processing module and configured to control the molding machine with the molding condition to perform an actual molding process for preparing the fiber-reinforced thermoplastic composite article.

The present disclosure also provides a molding system for preparing a fiber-reinforced thermoplastic composite article, comprising: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an anisotropic degree of the fibers in the composite molding material; and a controller coupled to the computing apparatus and configured to control the molding machine with the molding condition to perform an actual molding for the fiber-reinforced thermoplastic composite article.

The present disclosure also provides a molding system for preparing a fiber-reinforced thermoplastic composite article, comprising: a molding machine; a mold disposed on the molding machine and having a mold cavity for being filled with a composite molding material including a polymeric resin and a plurality of fibers; a processing module configured to generate an anisotropic stress distribution of the composite molding material in the mold cavity based on a molding condition for the molding machine, wherein the anisotropic stress distribution of the composite molding resin is generated based in part on consideration of an integral effect of a shear rate and an anisotropic degree of the composite molding material; a controller coupled to the computing apparatus and configured to control the molding machine with the molding condition to perform an actual molding for the fiber-reinforced thermoplastic composite article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A molding system for preparing a fiber-reinforced thermoplastic composite article, comprising:
   a molding machine;
   a mold disposed on the molding machine and having a mold cavity for being filled with a composite molding material including a polymeric resin and a plurality of fibers;
   a processing module configured to generate an anisotropic stress distribution of the composite molding material in the mold cavity based on a molding condition for the molding machine, wherein the anisotropic stress distribution of the composite molding resin is generated based in part on consideration of an anisotropic rotational diffusion effect of the fibers in the composite molding material; and
   a controller coupled to the processing module and configured to control the molding machine with the molding condition to perform an actual molding process for preparing the fiber-reinforced thermoplastic composite article.

2. The molding system of claim 1, wherein the rotational diffusion effect of the fibers is represented by an expression:

$$D_R = D:A_4:D$$

where $D_R$ represents the anisotropic rotational diffusion effect of the fibers in the molding material, D represents a rate of deformation of the molding material, and $A_4$ represents an orientation distribution of the fibers.

3. The molding system of claim 1, wherein the processing module is further configured to generate the anisotropic stress distribution of the composite molding material based in part on consideration of an integral effect of a shear rate and an anisotropic degree of the composite molding material.

4. The molding system of claim 3, wherein the integral effect of the shear rate and the anisotropic degree of the composite molding material is represented by an expression:

$$N_P(\dot{\gamma}) = N_{P0} \frac{1}{1 + (\dot{\gamma}/\dot{\gamma}_c)^2}$$

where $N_P(\dot{\gamma})$ represents the integral effect, $N_{P0}$ represents a constant, $\dot{\gamma}$ represents the shear rate, and $\dot{\gamma}_c$ represents a critical shear rate.

5. The molding system of claim 1, wherein the processing module is configured to generate the anisotropic stress distribution of the composite molding material based on an expression:

$$\tau' = 2\eta' D + 2\eta' \phi N_P(\dot{\gamma}) \left( \frac{D:A_4:D}{D:D} \right) D$$

where τ' represents the anisotropic stress distribution of the molding material, η' represents a shear viscosity distribution of the composite molding material, D represents a rate of deformation of the molding material, ϕ represents a fiber volume fraction, $N_P(\dot{\gamma})$ represents an integral effect of a shear rate and an anisotropic degree of the composite molding material, and $A_4$ represents an orientation distribution of the fibers.

6. A molding system for preparing a fiber-reinforced thermoplastic composite article, comprising:
   a molding machine;
   a mold disposed on the molding machine and having a mold cavity for being filled with a composite molding material including a polymeric resin and a plurality of fibers;
   a processing module configured to generate an anisotropic stress distribution of the composite molding material in the mold cavity based on a molding condition for the molding machine, wherein the anisotropic stress distribution of the composite molding resin is generated based in part on consideration of an anisotropic degree of the fibers in the composite molding material; and
   a controller coupled to the computing apparatus and configured to control the molding machine with the molding condition to perform an actual molding for the fiber-reinforced thermoplastic composite article.

7. The molding system of claim 6, wherein the anisotropic degree of the fibers is represented by a ratio of a fiber's shear rate to a resin's shear rate.

8. The molding system of claim 6, wherein the anisotropic degree of the fibers is represented by an expression:

$$\left( \frac{\dot{\gamma}_F}{\dot{\gamma}_R} \right)^2 = \frac{D:A_4:D}{D:D}$$

where $\dot{\gamma}_F$ represents the fiber's shear rate, $\dot{\gamma}_R$ represents the resin's shear rate, D represents a rate of deformation of the composite molding material, and $A_4$ represents an orientation distribution of the fibers.

9. The molding system of claim 6, wherein the processing module is further configured to generate the anisotropic stress distribution of the composite molding material based in part on consideration of an integral effect of a shear rate and an anisotropic degree of the composite molding material.

10. The molding system of claim 9, wherein the integral effect of the shear rate and the anisotropic degree of the composite molding material is represented by an expression:

$$N_P(\dot{\gamma}) = N_{P0} \frac{1}{1 + (\dot{\gamma}/\dot{\gamma}_c)^2}$$

where $N_P(\dot{\gamma})$ represents the integral effect, $N_{P0}$ represents a constant, $\dot{\gamma}$ represents the shear rate, and $\dot{\gamma}_c$ represents a critical shear rate.

11. A molding system for preparing a fiber-reinforced thermoplastic composite article, comprising:
   a molding machine;

a mold disposed on the molding machine and having a mold cavity for being filled with a composite molding material including a polymeric resin and a plurality of fibers;

a processing module configured to generate an anisotropic stress distribution of the composite molding material in the mold cavity based on a molding condition for the molding machine, wherein the anisotropic stress distribution of the composite molding resin is generated based in part on consideration of an integral effect of a shear rate and an anisotropic degree of the composite molding material; and a controller coupled to the computing apparatus and configured to control the molding machine with the molding condition to perform an actual molding for the fiber-reinforced thermoplastic composite article.

12. The molding system of claim 11, wherein the integral effect of the shear rate and the anisotropic degree of the composite molding material is represented by an expression:

$$N_P(\dot{\gamma}) = N_{P0} \frac{1}{1 + (\dot{\gamma}/\dot{\gamma}_c)^2}$$

where $N_P(\dot{\gamma})$ represents the integral effect, $N_{P0}$ represents a constant, $\dot{\gamma}$ represents the shear rate, and $\dot{\gamma}_c$ represents a critical shear rate.

* * * * *